United States Patent
Kusakabe et al.

(10) Patent No.: US 6,330,633 B1
(45) Date of Patent: *Dec. 11, 2001

(54) DATA PROCESSING METHOD AND APPARATUS

(75) Inventors: Susumu Kusakabe, Kanagawa; Masayuki Takada, Tokyo, both of (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,694

(22) Filed: Jul. 8, 1998

(30) Foreign Application Priority Data

Jul. 9, 1997 (JP) .................................................. 9-183534

(51) Int. Cl.[7] ...................................................... G06F 12/00
(52) U.S. Cl. ..................... 711/103; 365/218; 365/230.03; 365/185.29; 711/160
(58) Field of Search ....................... 711/103; 365/185.29, 365/185.33, 230.03, 218; 395/712

(56) References Cited

U.S. PATENT DOCUMENTS

| | | | |
|---|---|---|---|
| 5,524,230 | * 6/1996 | Sakaue et al. | 711/103 |
| 5,682,497 | * 10/1997 | Robinson | 711/103 |
| 5,701,492 | * 12/1997 | Wadsworth et al. | 395/712 |
| 5,841,699 | * 11/1998 | Miyauchi | 365/185.33 |
| 5,860,082 | * 1/1999 | Smith et al. | 711/103 |
| 5,937,423 | * 8/1999 | Robinson | 711/103 |
| 6,058,047 | * 5/2000 | Kikuchi | 365/185.33 |

FOREIGN PATENT DOCUMENTS

| | | |
|---|---|---|
| 0 565 389 | 10/1993 | (EP) . |
| 0 862 129 | 9/1998 | (EP) . |
| 2 730 833 | 8/1996 | (FR) . |
| 2 612 668 | 9/1998 | (FR) . |

* cited by examiner

*Primary Examiner*—Do Hyun Yoo
*Assistant Examiner*—Nasser Moazzami
(74) *Attorney, Agent, or Firm*—Sonnenschein, Nath & Rosenthal

(57) ABSTRACT

This invention relates to an information processing method and apparatus. A memory for storing information in block units, comprises a data region for storing data in block units and a first and a second region for storing plural block numbers which are numbers assigned to blocks in a data region. Data is written to a block of the data region corresponding to a block number stored in one of the first and second regions, the block number of the block to which data was written is stored in the other of the first and second regions, and the data in the one of the first and second regions is erased. In this way, there is less risk of memory corruption, and data can be read stably.

12 Claims, 18 Drawing Sheets

WRITING OF DATA (11, 12, 13, 14, 15, 16, 17, 18)

ERASURE OF 1ST REGION

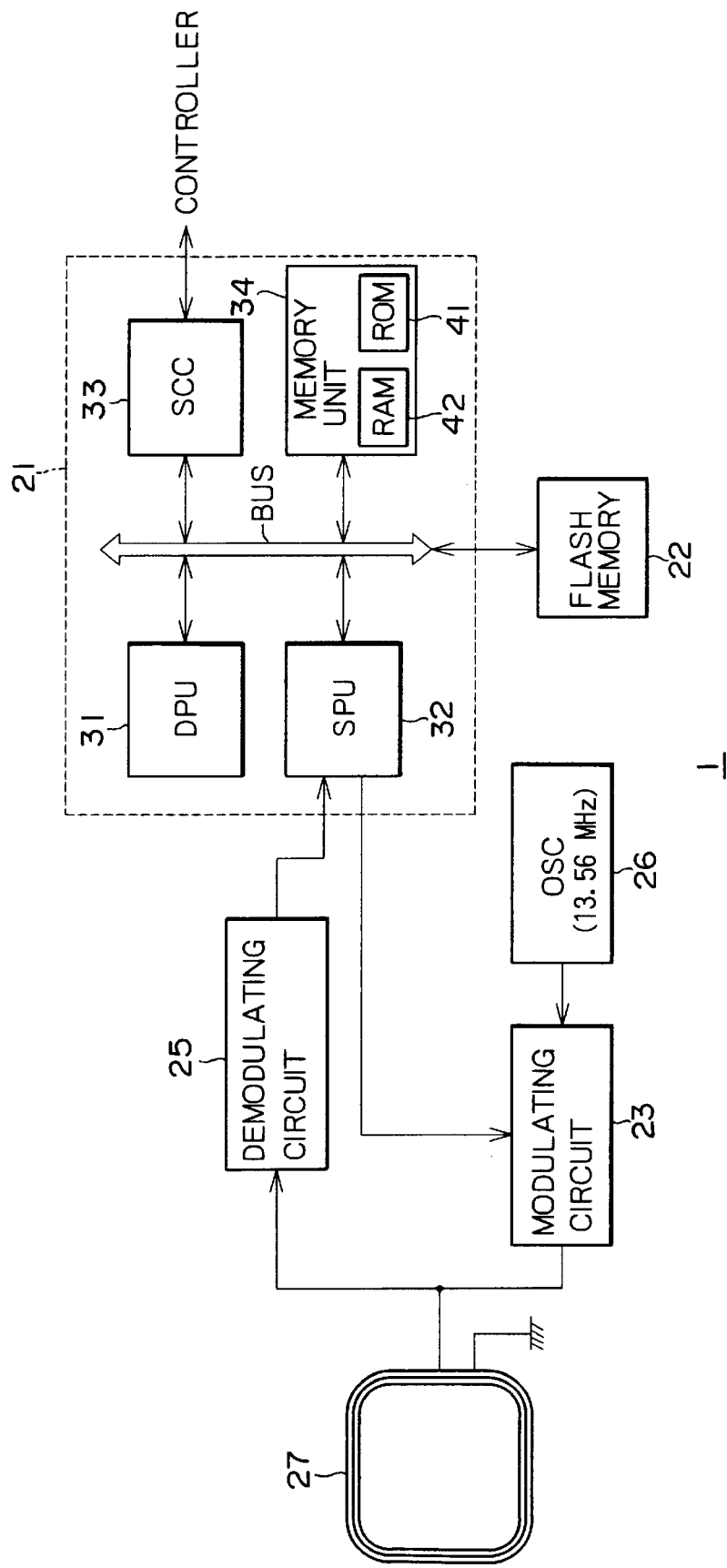

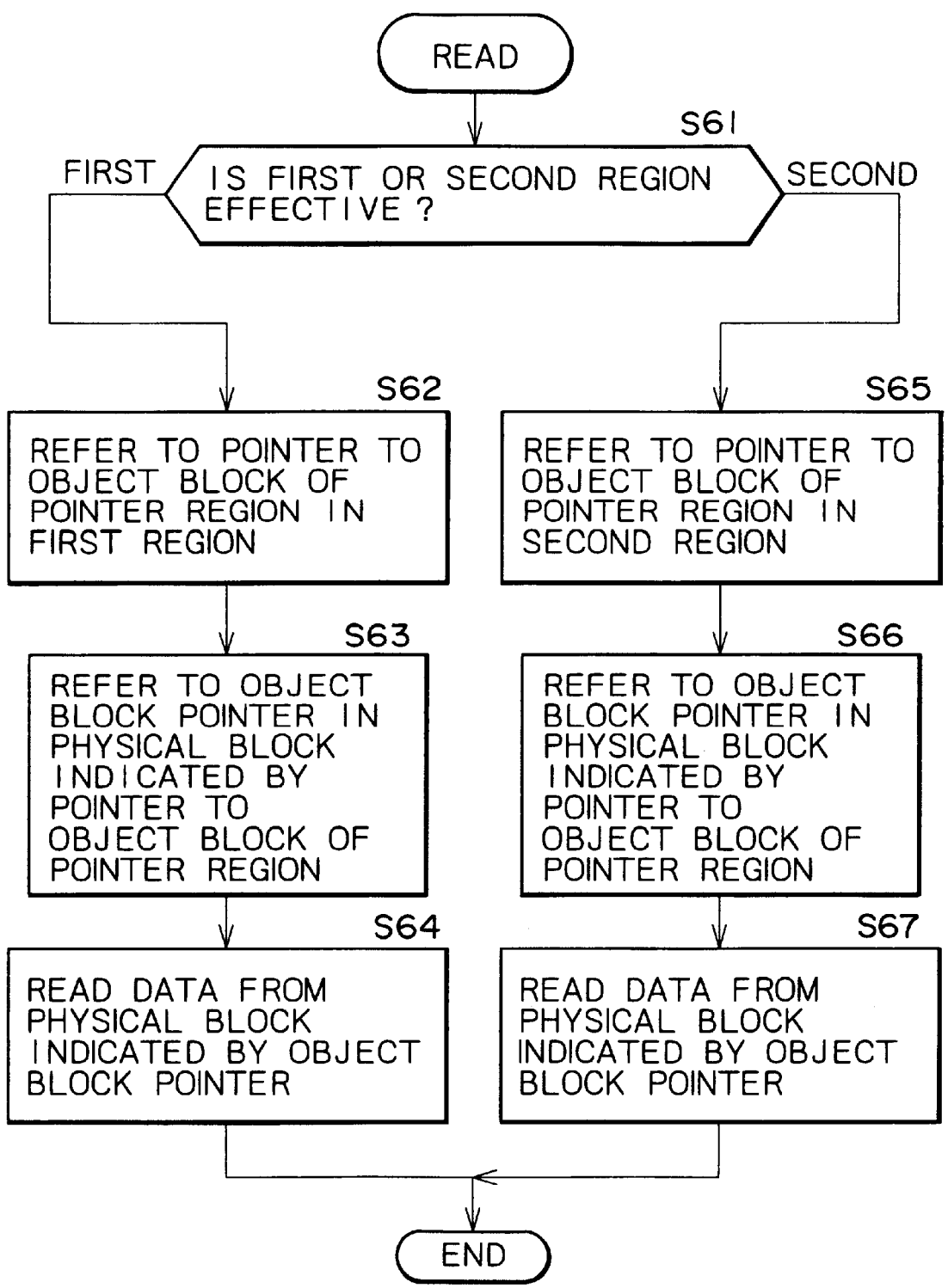

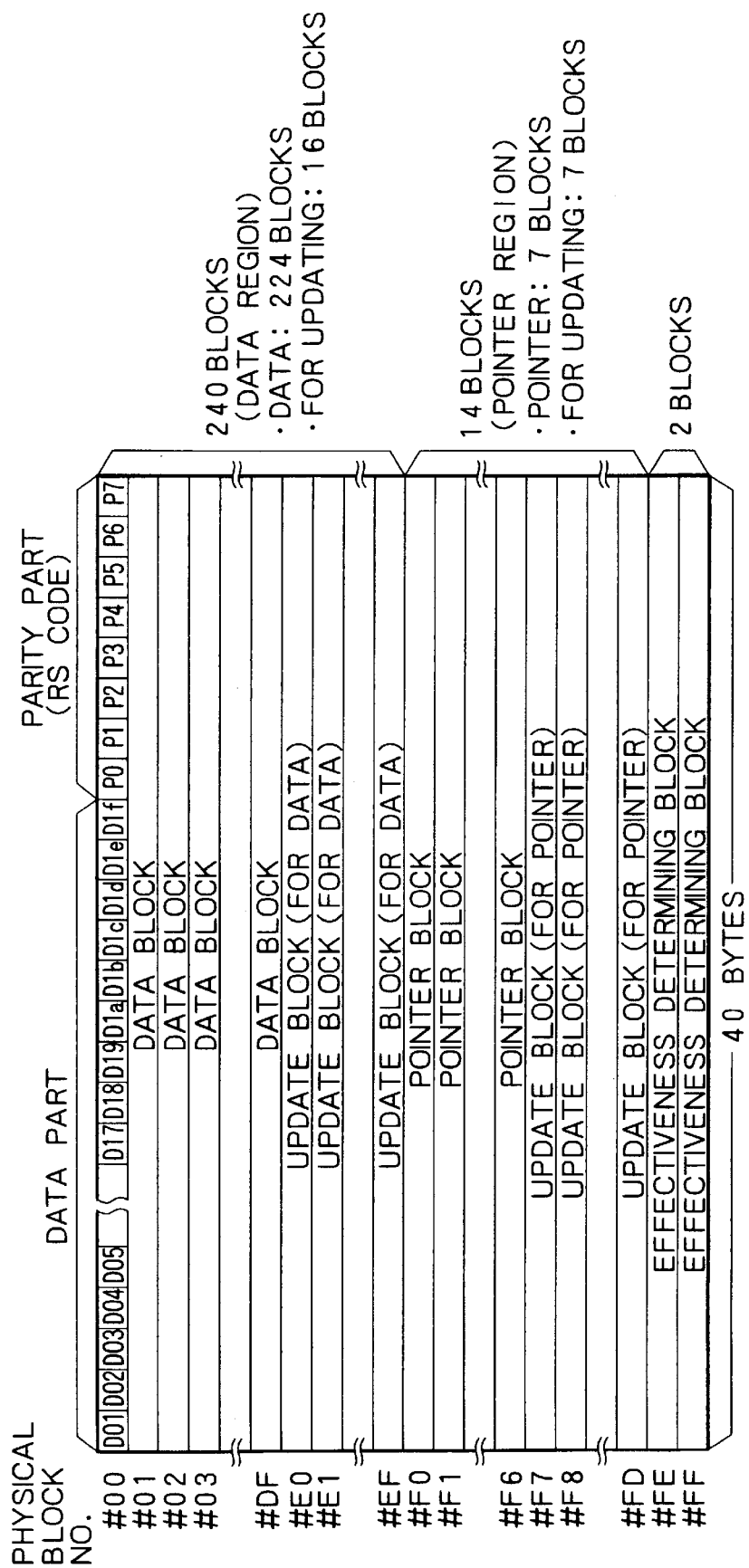

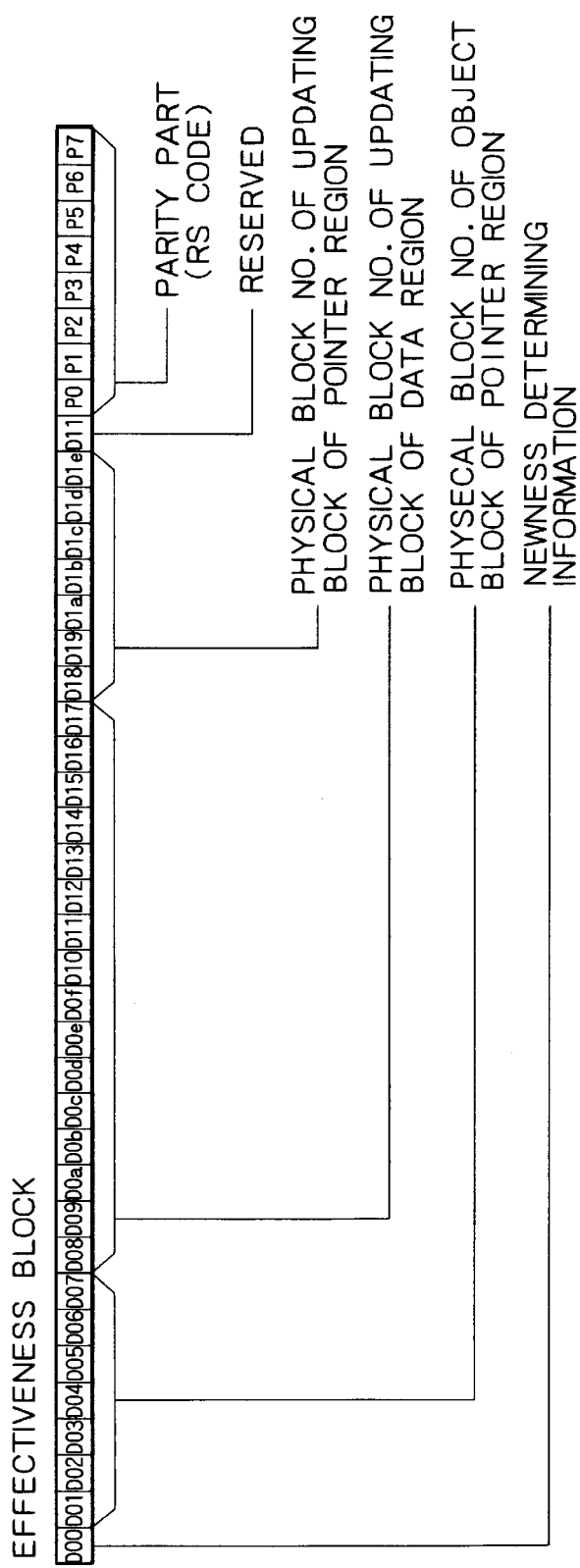

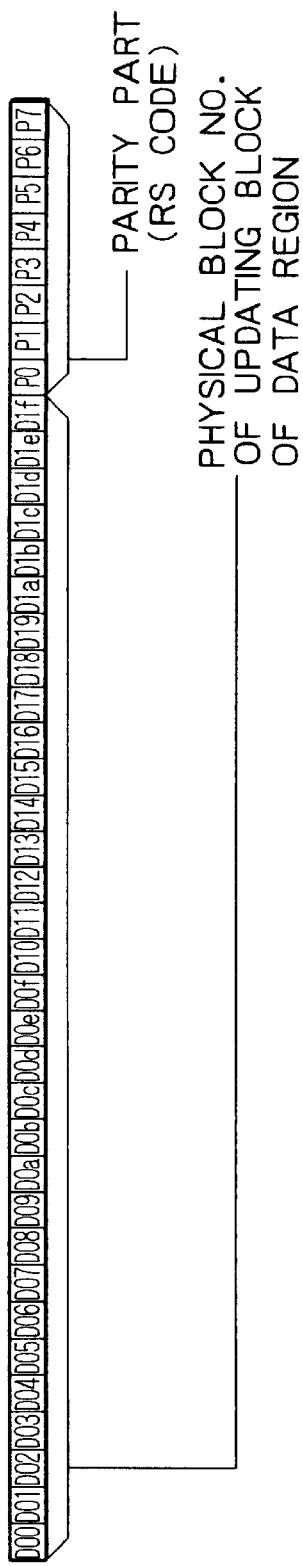

DATA PROCESSING METHOD AND APPARATUS

BACKGROUND OF THE INVENTION

1. Field of the Invention

The present invention relates to a data processing method and a data processing apparatus. In particular, it relates to a data processing method and a data processing apparatus preferably used in, for example, an IC (Integrated Circuit) card or the like which performs transmitting and receiving of data.

2. Description of the Related Art

An IC card (smart card) has been developed which is expected to find application in electronic money systems or security systems.

The IC card incorporates a CPU (Central Processing Unit) for carrying out various kinds of processing and a memory for storing data or the like necessary for processing in which transmitting and receiving of data is carried out in a state where the IC card is brought into contact with a predetermined reader/writer (R/W).

On the other hand, there is an IC card of a batteryless type having no battery of its own, and power is supplied to the IC card from a R/W unit.

Further, there is an IC card which performs transmitting and receiving of data between the IC card and the R/W without physical contact by using electromagnetic waves, and obtains the necessary power from the electromagnetic waves.

However, when data is transmitted and received between an IC card and a R/W without physical contact, a problem known as memory corruption occurrs if sufficient power cannot be obtained when reception of electromagnetic waves fails while accessing a memory in the IC card, and a compatibility defect occurs in the data in the memory.

Further, when data is transmitted and received by bringing the IC card into contact with the R/W, in the case where a user can freely insert or withdraw the IC card to or from the R/W, memory corruption may again occur if the IC card is withdrawn from the R/W while accessing the memory.

When data is held in units (sector in the case of MS-DOS) for storing data as in, for example, the File Allocation Table (FAT) of the MS-DOS (Microsoft-Disc Operating System) (registered trademark), if memory corruption occurs in the FAT, all the positional information of the data (file) is lost and data cannot be accessed.

Accordingly when memory corruption occurs, in the worst case, the IC card cannot be used and therefore, some countermeasure is needed against this memory corruption.

One method of dealing with this problem would be to leave data from the immediately preceding occasion and two occasions before, and update the data from two occasions before to new data so that, even if the data could not be satisfactorily updated (when the data from two occasions before is damaged), the data from the immediately preceding occasion would still remain.

When this was done however, if for example the power supply failed while the data from two occasions before was being updated, an unstable situation arose where it was impossible to read the updated data as correct or incorrect or the immediately preceding data was read.

OBJECT AND SUMMARY OF THE INVENTION

The present invention, which was conceived in view of such a situation, provides a way of ensuring that stable reading of one data is always possible.

The information processing method and apparatus according to this invention is characterized in that a memory comprises a data region for storing data in block units and a first and a second region for storing plural block numbers which are numbers assigned to blocks in a data region, data is written to a block of the data region corresponding to a block number stored in one of the first and second regions, the block number of the block to which data was written is stored in the other of the first and second regions, and the data in the one of the first and second regions is erased.

The invention is further characterized in that the memory may comprise a data region for storing data in said block units, a pointer region for storing plural block numbers assigned to blocks in the data region, and a first and second region for storing plural block numbers assigned to blocks in the pointer region, data is written to a block number of a block in the pointer region corresponding to a block number stored in the one of the first and second regions, and to a corresponding block in the data region, the block number of the block to which data was written is stored in a block of the pointer region, the stored block number of the block in the pointer region is stored in the other of the first and second regions, and the data stored in the one of the first and second regions is erased.

BRIEF DESCRIPTION OF THE DRAWINGS

FIG. 2 is a block diagram showing a typical construction of a reader/writer 1 of FIG. 1.

FIG. 14 is a flowchart for describing read processing by the double pointer system.

FIG. 16 is a flowchart showing a typical construction of an EEPROM 66 of FIG. 3 when data read is performed by the double pointer system.

FIGS. 17A and 17B are diagrams showing a typical construction of a physical block which is an effectiveness determining block.

FIGS. 18A and 18B are diagrams showing an example of physical blocks comprising a pointer area.

DETAILED DESCRIPTION OF THE INVENTION

Figure 1:
FIG. 1 is a block diagram showing a typical construction of one form of a no-contact card system to which the present invention is applied.

FIG. 1 shows a typical construction of one form of a no-contact card system to which the present invention is applied.

The no-contact card system comprises an R/W 1, an IC card 2 and a controller 3, data being transmitted and received between the R/W 1 and IC card 2 in a no-contact stateby-using electromagnetic waves. That is, the R/W 1 transmits a predetermined command to the IC card 2, and the IC card 2 receives the command and carries out processing in accordance with the command. Further, the IC card 2 transmits response data in accordance with the result of the processing to the R/W 1.

The R/W 1 is connected to the controller 3 via a predetermined interface (for example, in conformity with Specification RS-485A or the like) and the controller 3 causes the R/W 1 to perform predetermined processing by supplying a predetermined control signal to the R/W 1.

FIG. 2 shows a typical construction of the R/W 1 of FIG. 1.

In an IC 21, a DPU (Data Processing Unit) 31 for processing data, SPU (Signal Processing Unit) 32 for processing data transmitted to the IC card 2 and data received from the IC card 2, SCC (Serial Communication Controller) 33 for communicating with the controller 3, and memory unit 44 comprising a ROM 41 for prestoring information necessary for processing data and a RAM 42 for temporarily storing data during processing, are connected via a bus.

Further, a flash memory 22 for storing predetermined data is also connected to the bus.

The DPU 31 outputs a command for transmitting to the IC card 2 to the SPU 32, and receives response data from the IC card 2 from the SPU 32.

The SPU 32 carries out predetermined processing (for example, BPSK (Biphase Shift Keying) modulation on a command for transmitting to the IC card 2, outputs it to a modulating circuit 23, receives response data transmitted from the IC card 2 from a demodulating circuit 25, and performs predetermined processing (e.g. BPSK) on the data.

The modulating circuit 23 modulates a carrier wave at a predetermined frequency (for example, 13.56 MHz) supplied from an oscillator 26 which is ASK (Amplitude Shift Keying) modulated by data supplied from the SPU 32, and outputs a modulated wave to the IC card 2 as an electromagnetic wave via an antenna 27. In this case, the modulating circuit 23 performs ASK modulation with a modulation degree of less than 1. That is, even when the data is low level, the maximum amplitude of the modulated wave does not become zero.

The demodulating circuit 25 demodulates the modulated wave (ASK-modulated wave) received via the antenna 27, and outputs demodulated data to the SPU 32.

Figure 3:
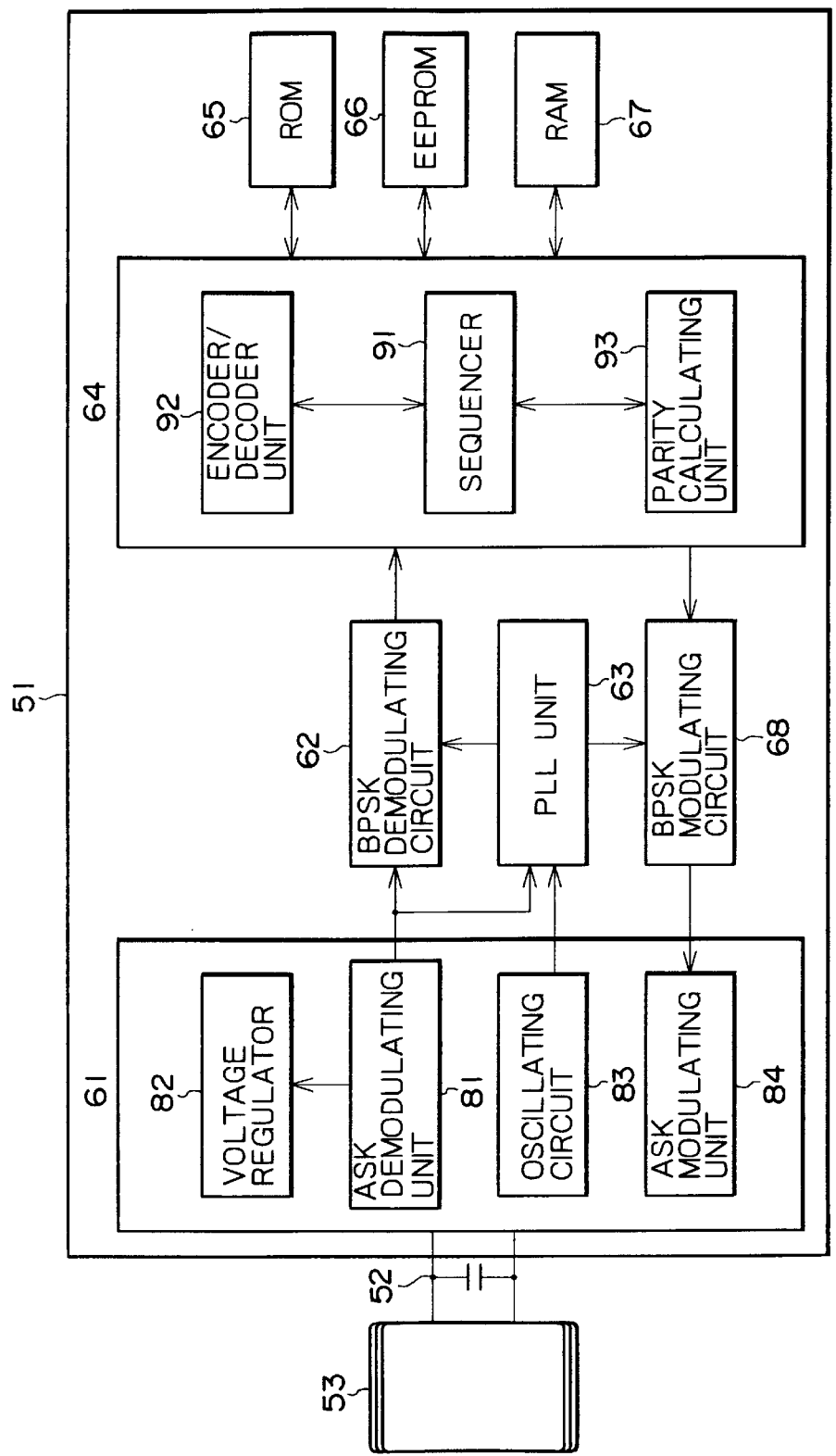
FIG. 3 is a block diagram showing a typical construction of an IC card 2 of FIG. 1.

FIG. 3 shows a typical construction of the IC card 2 of FIG. 1. In the IC card 2, an IC 51 receives the modulated wave transmitted from the R/W 1 A condenser 52 comprises an LC circuit and an antenna 53, and synchronizes (resonates) with an electromagnetic wave having a predetermined frequency (carrier frequency)

In the IC 51, an RF interface unit 61 detects and demodulates the modulated wave (ASK-modulated wave) received via the antenna 53 in an ASK demodulating unit 81, and outputs demodulated data to a BPSK demodulating circuit 62 and a PLL (Phase Locked Loop) unit 63. In a voltage regulator 82, a signal detected by the ASK demodulating unit 81 is stabilized and supplied to various circuits as direct current power.

In the RF interface unit 61, an oscillating circuit 83 generates a signal having a frequency identical to that of a clock frequency of data, and outputs the signal to the PLL unit 63.

An ASK demodulating unit 84 of the RF interface unit 61 ASK modulates the modulated wave received via the antenna 53 by varying the load of the antenna 53 which is a power source for the IC card 2 (for example, a predetermined switching element is switched ON/OFF corresponding to data and a predetermined load is connected in parallel with the antenna 53 only when the switching element is ON) corresponding to data supplied from a computing unit 64, and this modulated component is transmitted to the R/W 1 via the antenna 53 (the terminal voltage of the antenna 27 of the R/W 1 is varied).

The PLL unit 63 generates a clock signal from data supplied from the ASK demodulating unit 81 in synchronism with the data, and outputs the clock signal to a BPSK demodulating circuit 62 and a BPSK modulating circuit 68.

When data demodulated by the ASK demodulating unit 81 is BPSK modulated, the BPSK demodulating circuit 62 performs BPSK demodulation of the data in accordance with the clock signal supplied from the PLL unit 63, and outputs the demodulated data to the computing unit 64.

When data supplied from the BPSK modulating circuit 62 is encrypted, the computing unit 64 decodes the data in an encoder/decoder unit 92 and processes the data in a sequencer 91 (data writing unit) (block number writing unit) (first and second block number writing unit). Further, when the data is not encrypted, data supplied from the BPSK demodulating circuit 62 is directly supplied to the sequencer 91 without being processed by the encoder/decoder unit 92.

The sequencer 91 performs processing corresponding to data supplied to it as commands. That is, for example, the sequencer 91 writes or reads data to or from an EEPROM 66 (storage unit).

A parity computing unit 93 of the computing unit 64 computes a Reed-Solomon code as a parity from the data to be stored in the EEPROM 66 or the data stored in the EEPROM 66.

Further, after carrying out predetermined processing in the sequencer 91, the computing unit 64 outputs response data corresponding to the processing (data for transmitting to the R/W 1) to the BPSK modulating circuit 68.

The BPSK modulating circuit 68 BSK modulates the data supplied from the computing unit 64, and outputs the modulated data to the ASK modulating unit 84 of the RF interface unit 61.

A ROM 65 stores processing programs to be executed by the sequencer 91 or other necessary data. A RAM 67 temporarily stores data or the like during processing.

The EEPROM 66 is a nonvolatile memory, and continues storing data even after the IC card 2 has finished communicating with the R/W 1 and supply of power is stopped.

Next, an explanation will be given of data transmission and reception between the R/W 1 and the IC card 2.

The R/W 1 (FIG. 2) emits predetermined electromagnetic waves from the antenna 27, monitors a load state of the antenna 27 and waits until a change of the load state is detected by the approach of the IC card 2.

In this case, the R/W 1 may perform repeat processing (polling) by emitting electromagnetic waves which are ASK modulated with data having a predetermined short pattern and calling the IC card 2 until a response from the IC card 2 is obtained within a fixed time period.

In the R/W 1, when approach of the IC card 2 is detected, the SPU 32 of the R/W 1 performs BPSK modulation by data transmitted to the IC card 2 (commands corresponding to processing to be performed by the IC card, data written to the IC card 2 or the like) with a rectangular wave having a predetermined frequency (for example, a frequency twice as high as the clock frequency of the data) as a carrier, and outputs a modulated wave (BPSK modulated signal) to the modulating circuit 23.

In BPSK modulation, data can be made to correspond to a change in the phase of the modulated wave by using differential conversion, and in this case, as the BPSK-modulated is demodulated to the original data even when the BPSK-modulated signal is inverted, there is no need to consider the polarity of the modulated wave.

The modulating circuit 23 performs ASK modulation on the predetermined carrier wave with a modulation degree (=maximum amplitude of data signal/maximum amplitude of carrier wave) of less than 1 (for example, 0.1), and transmits the modulated wave (ASK-modulated wave) to the IC card 2 via the antenna 27.

When the transmission is not performed, the modulating circuit 23 generates a modulated wave having, for example, a high level of two levels (high level and low level) of a digital signal.

In the IC card 2 (FIG. 3), part of the electromagnetic waves irradiated from the antenna 27 of the R/W 1 is converted into an electric signal in an LC circuit comprising the antenna 53 and the condenser 52, and the electric signal (modulated wave) is outputted to the RF interface 61 of the IC 51. The ASK demodulating unit 81 of the RF interface 61 then performs envelope detection by rectifying and smoothing the modulated wave, supplies a signal formed thereby to the voltage regulator 82, extracts a data signal by suppressing the direct current component of the signal and outputs the data signal to the BPSK demodulating circuit 62 and the PLL unit 63.

The voltage regulator 82 stabilizes the signal supplied from the ASK demodulating unit 81, generates direct current power and supplies it to various circuits.

In this case, a terminal voltage V0 of the antenna 53 is represented by, for example, the following equation:

$$V0 = V10(1 + kVs(t))\cos(\omega t)$$

where $V10\cos(t)$ represents the carrier wave, k designates the modulation degree and $Vs(\omega t)$ represents the data outputted from the SPU 32, respectively.

Further, a value VLR at the low level of a voltage V1 which is rectified by the ASK demodulating unit 81, is represented by, for example, the following equation:

$$VLR = V10(1 + k(-1)) - Vf$$

In this equation, Vf designates a voltage drop at a diode forming a rectifying circuit for performing rectification and smoothing in the ASK demodulating unit 81, and is generally about 0.7 volts.

When the voltage regulator 82 receives the signal rectified and smoothed by the ASK demodulating unit 81, the signal is stabilized and supplied as direct current power to various circuits including the computing unit 64. As the demodulation degree "k" of the demodulated wave is less than 1, the voltage fluctuation (difference between high level and low level) after rectification is small. Direct current power can therefore easily be generated in the voltage regulator 82.

For example, when a modulated wave having a modulation degree "k" of 5% is received such that V10 is 3 volts or higher, the low level voltage VLR after rectification is 2.15 (=3(1−0.05)−0.7) volts or higher, and therefore the voltage regulator 82 can supply sufficient voltage as a power source for various circuits. Further, in this case, an amplitude 2kV10 (Peak to Peak value) of an alternating current component (data component) of the voltage V1 after rectification is 0.3 (=2×0.05×3) volts or higher and accordingly, the ASK demodulating unit 81 can demodulate data with a sufficiently high S/N ratio.

In this way, communication with a low error rate (with a high S/N ratio) can be performed by using the ASK-modulated wave having a modulation degree "k" of less than 1, and a direct current voltage which is sufficient as a power source is supplied to the IC card 2.

Upon receiving the data signal (BPSK-modulated signal) from the ASK demodulating unit 81, the BPSK demodulating circuit 62 demodulates the data signal in accordance with the clock signal supplied from the PLL unit 63, and outputs modulated data to the computing unit 64.

If the data supplied from the BPSK demodulating circuit 62 is encrypted, the computing unit 64 decodes the data in the encoder/decoder unit 92, and supplies the data (commands) to the sequencer 91. During this period, that is, after having transmitted the data to the IC card 2, the R/W 1 waits for a time period until receiving a response thereto after having sent data with a value of 1. Therefore during this period, the IC card 2 receives a modulated wave having a constant maximum amplitude.

After having finished processing, the sequencer 91 outputs data (data for transmitting to the R/W 1) regarding the result of processing or the like to the BPSK modulating circuit 68. In a similar way to the SPU 32 of the R/W 1, the BPSK modulating circuit 68 BPSK-modulates the data, and thereafter the circuit outputs the data to the ASK modulating unit 84 of the RF interface unit 61.

The ASK modulating unit 84 ASK-modulates the received modulated wave (when the IC card 2 transmits data, as described above, the maximum amplitude of the modulated wave outputted by the R/W 1 is constant) in accordance with the data to be transmitted by varying the load connected to both ends of the antenna 53 by utilizing a switching element. The terminal voltage of the antenna 27 of the R/W 1 is thereby varied, and the data is transmitted to the R/W 1.

On the other hand, when data is received from the IC card 2, the modulating circuit 23 of the R/W 1 continues transmitting data having the value of 1 (high level). The data transmitted by the IC card 2 is detected by the demodulating circuit 25 from the very small variation of terminal voltage (for example, several tens of microvolts) of the antenna 27 which is electromagnetically coupled to the antenna 53 of the IC card 2.

In the demodulating circuit 25, the detected signal (ASK-modulated wave) is amplified by an amplifier having a high gain and demodulated, and the digital data obtained as a result of demodulation is outputted to the SPU 32. The SPU 32 demodulates the data (BPSK-modulated signal) and outputs it to the DPU 31. The DPU 31 processes the data from the SPU 32 and determines whether or not the communication is to be terminated according to the processing result. Further, when it is determined that the communication is to be performed again, as in the above-described case, communication is performed between the R/W 1 and the IC card 2.

On the other hand when it is determined that the communication is to be terminated, the R/W 1 terminates communication processing with the IC card 2.

As described above, the R/W 1 transmits data to the IC card 2 by utilizing ASK modulation having a modulation degree "k" of less than 1. The IC card 2 receives the data, performs processing corresponding to the data, and returns data corresponding to the processing result to the R/W 1.

Next, an explanation will be given of read and write processing of data to and from the EEPROM 66 by the sequencer 91 of the IC card 2 (FIG. 3). First, however, an explanation will be given of a method of dealing with memory corruption according to the present invention as a preparatory measure.

First, an explanation will be given of the basic principle of a method of dealing with memory corruption.

For example, assume that reading and writing of information to and from a memory is performed by a predetermined blockunit, and consider a case where data stored in a certain block B1 is updated (the data stored in the block B1 is rewritten by other data).

In this case, when the new data is written (overwritten on the stored data) to the block B1 per se, if the power supply to the IC card fails during a write operation, the new data cannot be written completely so that memory corruption is caused.

If memory corruption occurs when the new data to be written to the block B1 is actually written to the block B1, the system cannot deal therewith. That is, for example, if memory corruption occurs when data stored in the block B1 is a balance of electronic money or the like, new purchases are made and the sum remaining after subtracting the purchases is written as new data through the above-described method, the IC card cannot be used.

Hence, the new data to be written to the block B1 is written to a block B2 different from the block B1. In this way, if memory corruption occurs while writing the new data to the block B2, the new data cannot be written completely so that its effectiveness cannot be guaranteed, but at least the data stored in the block B1 can be prevented from being destroyed. Finally, after writing to the block B2 is complete, the data stored in the block B1 is erased.

When even newer data is supplied, this data is written to a block different from the block B2, for example, the block B1. In this way, when new data is supplied, the new data is written to a block other than the block in which data written on the immediately preceding occasion is stored. At least, therefore, the data that was written on the immediately preceding occasion is prevented from destruction by writing new data, and even in the worst case, the IC card can still be used.

Next, a description will be given of a method of reading and writing data to and from a memory to which the above-described basic principle applies referring to FIGS. 4A and 4B.

Figure 4A:
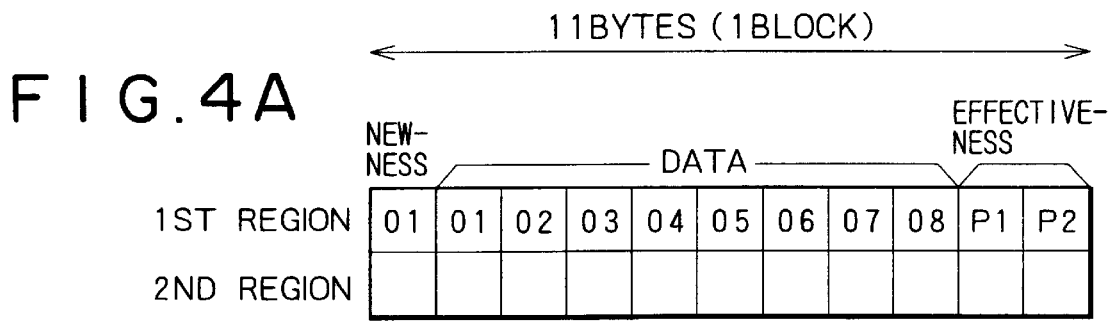
FIGS. 4A–4C are diagrams for describing the basic principle of the present invention.
Figure 4B:
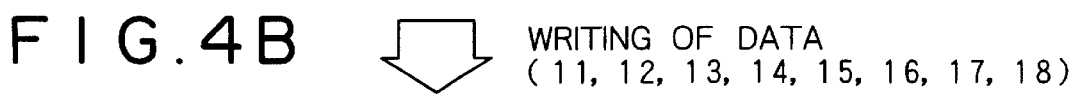

In FIGS. 4A and 4B, one block comprises 11 bytes where 1 byte (8 bits) of newness information, 8 bytes of data and 2 bytes of effectiveness information are successively arranged from the front end. However, the number of bits of 1 block, and the numbers of bits allocated to newness information, data and effectiveness information are not particularly limited to those described above.

The newness information indicates the newness of the storage content of the block. For example, the absolute date and time, or a sequential number or the like can be used. When the absolute date and time is used, in the case where the date and time of storing data is stored as newness information, the newest block storing data can be detected from the newness information. Further, when a sequential number is used, in the case where, for example, an incremented number is stored as the newness information on every occasion data is written, the block having the largest value is the newest one for writing data.

Herein, it is sufficient if it is possible to identify which one of at least two blocks is new and therefore, the newness information should be able to represent at least three states. That is, for example, when the three values 0, 1 and 2 are assumed to be used as newness information capable of representing three states, every time data is written to either of the two blocks, 0, 1, 2, 0, . . . may be written as the newness information of the block to which data is written. In this case, when the newness information of two blocks is 0 and 1, the block with 1 is newer, when they are 1 and 2, the block with 2 is newer, and when they are 2 and 0, the block with 0 is newer. When the three values 0, 1 and 2 are used as newness information in this way, only two bits is required. Alternatively, for example, three flags each of one bit may be used as newness information, and the bit with the flag may successively be changed every time data is written to the block.

Herein, in the following, the three values 0, 1 and 2 will be used as newness information.

Next, effectiveness information indicates, so to speak, the effectiveness (effective or ineffective) of the newness information and data concerning whether writing of the newness information and the data of the block was normally completed, for which a RS (Reed-Solomon) code or the like may be used.

The effectiveness information is not limited to an error correction code such as an RS code or the like. That is, it is sufficient if the effectiveness information can represent whether the effectiveness information and the data are effective or ineffective as described above and accordingly, the effectiveness information may for example be a parity that is calculated while writing the newness information and the data, or may for example be a flag of 1 bit that is added after the newness information and data are correctly written.

In FIGS. 4A and 4B, the memory is provided with two blocks which are a first and second region. FIG. 4A shows a situation where data 01H through 08H (H represents a hexadecimal number) have already been stored in the block of the first region and data have been erased in the block of the second region.

In this case, assuming that for example 11H through 18H were supplied as new data, firstly, the effectiveness of the two blocks of the first and second regions is determined by referring to the effectiveness information. Herein, it will be assumed that only the block of the first region was effective.

In the case of writing new data, as described above, in order to prevent data which was written on the immediately preceding occasion from being destroyed, the new data is written to the block in which data has not been recorded. Accordingly in this case, as shown by, for example, FIG. 4(B), the data 11H through 18H are written to the block of the second region. After completing the writing of the data 11H through 18H, firstly, the newness information of the block to which the data was written is updated. That is, as the newness information for the block of the first region which was the newest block is designated by 01H, the newness information of the block of the second region to which data has now been written is designated by 02H which is obtained by incrementing 01H by 1, and writing of the effectiveness information expressing the effectiveness of the newness information 02H is performed.

Figure 4C:

Finally, after all writing to the block which is the second region is complete, all data recorded in the block which is the first region is erased as shown in, for example, FIG. 4C.

Figure 5A:
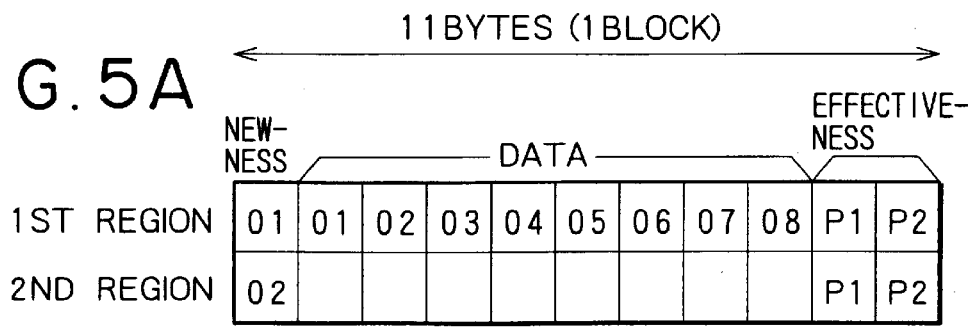
FIGS. 5A–5E are diagrams for describing the basic principle of the present invention.
Figure 5B:
Figure 5C:
Figure 5D:
Figure 5E:
Figure 6:
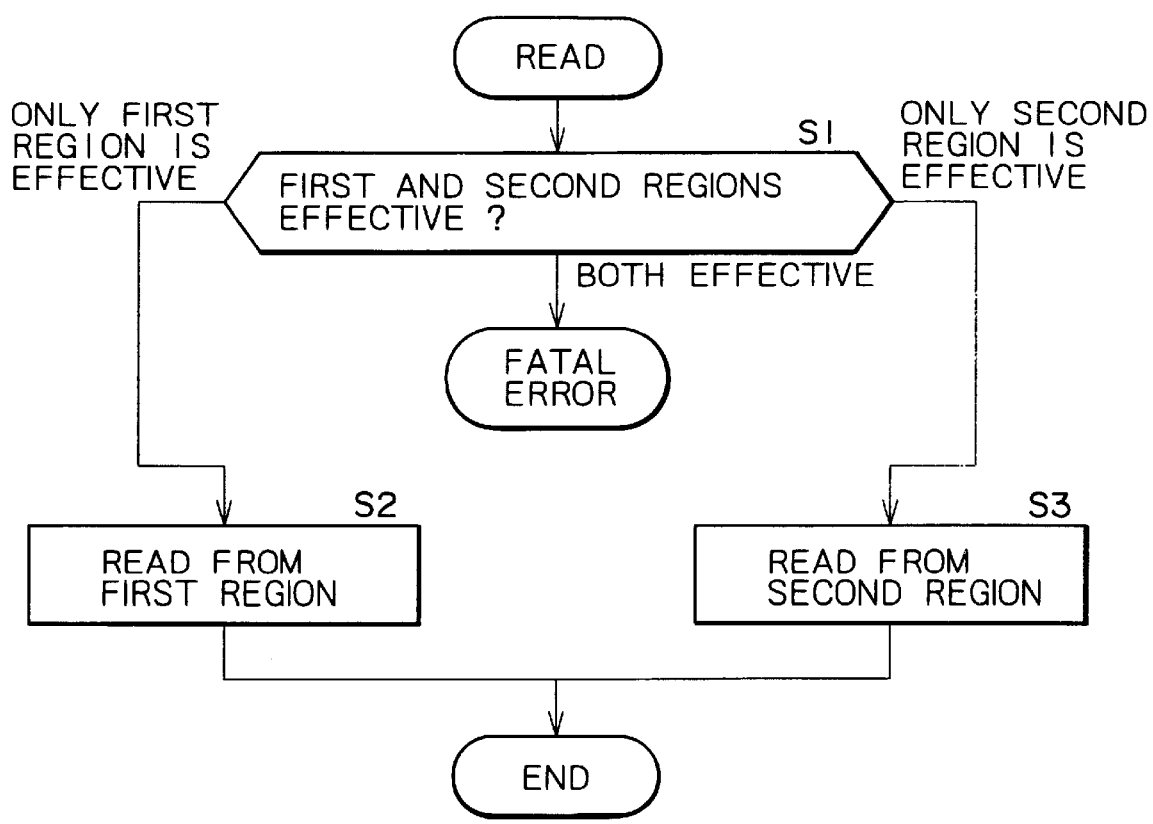
FIG. 6 is a flowchart for describing read processing relating to the memory having the construction shown in FIGS. 4A–4C.

Next, a more detailed description of data read/write processing in the memory having the construction shown by FIG. 4 by referring to the flowcharts of FIG. 5 and FIG. 6.

First, a description will be given of read processing by referring to the flowchart of FIG. 6.

First, in a step S1, the effectiveness is determined by referring to the effectiveness information of the first and the second regions. When only the block of the first region is determined to be effective in the step S1, the routine proceeds to a step S2 and data is read from the first region, that is the effective block, and the process is terminated. Further, when only the block of the second region is determined to be effective in the step S1, the routine proceeds to a step S3, data is read from the second region, that is the effective block, and the process is terminated. When it is determined that the blocks of both the first and second region are ineffective, the hardware life of the IC card 2 is exhausted, and read processing is not performed (error processing is performed).

Next, an explanation will be given of write processing referring to the flowchart of FIG. 7.

In this case, the effectiveness is determined in a step S11 similar to the case of the step S1 in FIG. 6. When both the first and second regions are ineffective, the IC card 2 has a fatal error, for example due to end-of-life, and error processing is performed. In the step S11, when it is determined that the block of the first region is effective, the routine proceeds to a step S12, and it is determined whether or not the data of the second region which is ineffective has been completely erased. When it is determined that the data has not been completely erased, the routine proceeds to a step S20, and when it is determined that the data has been completely erased, the routine proceeds to a step S13. In the step S20, data in the second region which is the ineffective block is erased, and the routine proceeds to the step S13.

In the step S13, new data with its newness and effectiveness information is written (updated) to the block which is the second region in which data was erased, and the routine proceeds to a step S14. In the step S14, data in the block which is the first region is erased.

In the step S11, when it is determined that the block which is the second region is effective, the routine proceeds to a step S15, and it is determined whether or not the data in the first region which is the ineffective block was completely erased. When it is determined that the data was not completely erased, the routine proceeds to a step S22, and when it is determined that the data was completely erased, the routine proceeds to a step S16. In the step S22, data in the first region which is the ineffective block is erased, and the routine proceeds to the step S16.

In the step S16, new data with its newness and effectiveness information is written (updated) to the block which is the first region in which data was erased, and the routine proceeds to a step S17. In the step S17, data in the block which is the second region is erased.

If for example the power supply fails before erasing or while erasing the old data in the step S14 or S17, it may occur that the old data remains without being erased, or only part of the data is updated so that the parity happens to be correct as shown in FIG. 5A, and memory corruption occurs. In this case, data in both of the blocks is determined to be effective in the step S11, so the routine proceeds to a step S18.

In the step S18, when it is determined that the second region is newer than the first region, the routine proceeds to a step S21, data with its newness and effectiveness information is rewritten to the new block which is the second region, for example as shown in FIG. 5B, and the routine proceeds to the step S22. Subsequently in the step S22, in the same way as described above, data in the first region which is not the newest block is erased as shown for example in FIG. 5C, and the routine proceeds to the step S16.

In the step S16, new data with its newness and effectiveness information is written (updated) to the block which is the first region in which data was erased, and the routine proceeds to the step S17. In the step S17, data in the block which is the second region is erased as shown for example in FIG. 5E.

In the step S18, when it is determined that the first region is newer than the second region, the routine proceeds to a step S19, data with its newness and effectiveness information is rewritten to the new block which is the second region, and the routine proceeds to the step S20. Subsequently in the step S20, in the same way as described above, data in the second region which is not the newest block is erased, and the routine proceeds to the step S13. In the step S13, new data with its newness and effectiveness information is written (updated) to the block which is the second region in which data was erased, and the routine proceeds to a step S14. In the step S14, data in the block which is the first region is erased.

Each time that data is read, an unstable state wherein the data is deemed to be correct or incorrect is prevented by allowing sufficient time for recording. Due to the above processing, the erasure of either the first or second region means that sufficient time is available for recording in the other remaining region. The situation where reading of this recorded data is unstable is therefore prevented.

The two blocks of the first and the second regions are identified from outside as the same logical block. Specifically, the blocks of the first and the second regions are physical blocks which are physically existing blocks, and these physical blocks are respectively assigned physical block numbers which are unique numbers for identification thereof. The physical block numbers of the physical blocks of the first and second regions are made to correspond with the same number which is a logical block number for identifying the logical block by which the physical blocks of the first and the second regions are recognized from outside.

In what follows, both the physical block number and the logical block number is assumed to be represented by one byte.

In the above case, after completing the writing of data to one physical block, the newness information and the effectiveness information of the physical block are updated and therefore, when plural related data are written to plural physical blocks, a mixture of new and old data may be generated. Viewed from outside, if memory corruption occurs while writing plural data to a plurality of logical blocks, although new data exists in a logical block to which new data was written before memory corruption occurred, old data exists in a range from the logical block where the memory corruption occurred to the logical block whereto the new data would have been written if memory corruption had not occurred.

In the case where the plurality of related data are meaningful as a total thereof and accordingly, the total thereof is useful, as described above, when new data and old data are mixed in the plural related data, compatibility cannot be established. That is, for example in the case where the plural related data are a station and time to board a train, station and time to leave the train and the fare between stations for boarding and leaving the train as mentioned above, when new data is written regarding the station for boarding the train and old data remains regarding the time for boarding the train, compatibility cannot be established and the data becomes meaningless.

Accordingly, when memory corruption occurs in the case where plural related data are written to plural logical blocks before writing of the plural data has been completed, it is necessary to make all the old data in the plural related data exist in the logical block when viewed from outside.

Figure 8:
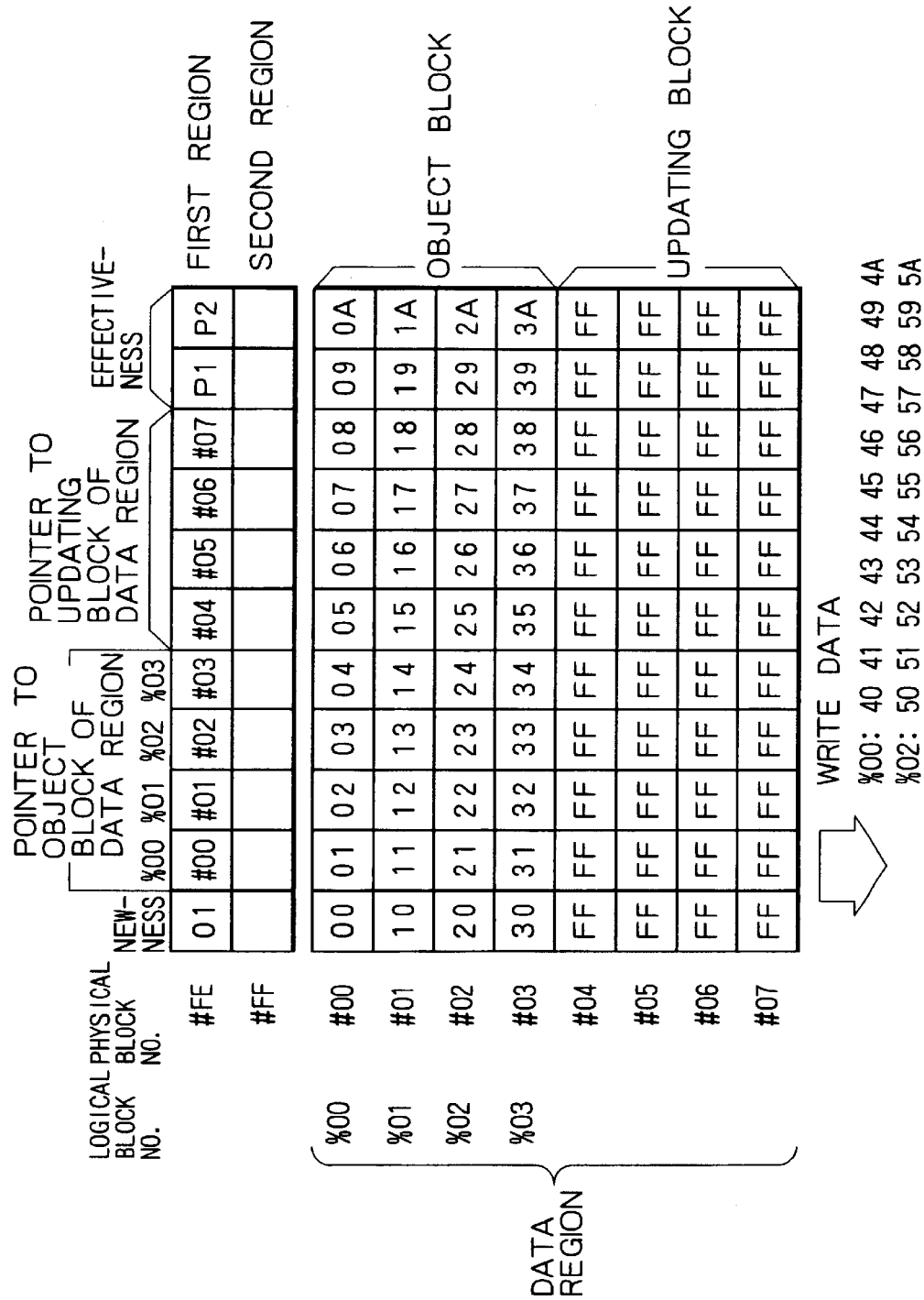
FIG. 8 is a diagram showing a typical construction of a memory to which a single pointer system is applied.

Hence, a memory has the construction shown in, for example, FIG. 8.

That is, the memory comprises physical blocks which are data regions for storing data, and physical blocks of a first and a second region for storing physical block numbers of the physical blocks comprising the data regions.

Further in FIG. 8, similar to the case of FIG. 4 and FIG. 5, one physical block comprises 11 bytes.

The respective physical blocks comprising the data region store data in these 11 byte units and in FIG. 8, the data region comprises eight physical blocks respectively designated by #00H through #07 which are physical block numbers (# represents a physical block number).

In this case, when viewed from outside, four logical blocks are visible, and % 00H through % 03H are allocated to each of the four logical blocks as logical block numbers. In the state shown in FIG. 8, the logical block numbers % 00H through % 03H are made to correspond respectively to the physical block numbers #00H through #03H.

In the physical blocks of the first and the second regions, the leading byte is allocated to newness information and the last two bytes are allocated to effectiveness information, respectively, which is a common feature in FIG. 4. However, the physical block numbers of the physical blocks in the data region, that is, pointers to the physical blocks comprising the data region are arranged in the eight bytes between the newness information and the effectiveness information.

Of the 8 bytes between the newness information and the effectiveness information in the first and second regions, the physical block numbers of object blocks of the data region are arranged in the first 4 bytes and the physical block numbers of updating blocks of the data region are arranged in the second 4 bytes.

In this context, an object block means a physical block to which information should be written. That is, for example, according to the basic principle mentioned above, when data stored in the block B1 is rewritten by new data, the new data is written to the block B2, but in this case the block B1 in which the new data should be written corresponds to the object block.

An updating block means a physical block for updating which is used when information is written to a physical block and the storage content thereof is updated. That is, for example, according to the basic principle, when data stored in the block B1 is rewritten by new data, the block B2 actually written with the new data corresponds to the updating block.

The four physical block numbers arranged in the first 4 bytes of the 8 bytes between the newness information and effectiveness information in the first and second regions, are made to correspond to the logical block numbers. That is, for example, the physical block numbers from the 1st to the 4th byte thereof are made to correspond to the logical block numbers % 00H through % 03H, respectively.

Further, in FIG. 8, the physical block number of the first or second region is respectively designated by #FE or #FF.

In the memory having the above construction, in FIG. 8, four related data are stored in physical blocks #00H (physical block having the physical block number #00H) through #03H, and the physical block numbers thereof #00H through #03H are arranged in this order in the first 4 bytes of the 8 bytes between the newness information and the effectiveness information in the first region (hereinafter, pertinently referred to as a column of pointers to the object blocks in data region).

Accordingly, looking at the first region for example, the physical block numbers #00H through #03H are made to respectively correspond to the logical block numbers % 00H through % 03H.

In this case, looking at the first region, any of the physical blocks #00H through #03H which are made to correspond to the logical blocks % 00H (logical block having a logical number of % 00H) through % 03H, is a block that should be accessible, i.e. an object block.

The updating block can be a physical block which does not constitute an object block at that time, or a vacant region so to speak.

Accordingly in FIG. 8, looking at the first region, the physical blocks #04H through #07H can be updating blocks. The physical block numbers #04H through #07H of the updating blocks are arranged in the last 4 bytes of the 8 bytes between the newness information and the effectiveness information of the first region (hereinafter, pertinently referred to as a column of pointers to the updating blocks of the data region).

Now for example, assume that only the first region of the first and second regions is effective, and a request to write two related data is made from outside to the logical blocks corresponding to the logical block numbers % 00H and % 02H.

In this case, by referring to the column of pointers to the object blocks of the data region in the effective first region, the physical block numbers #00H and #02H corresponding to the logical block numbers % 00H and % 02H are recognized, and the physical blocks #00H and #02H are recognized as the object blocks to which the related two data are to be written.

Further, by referring to the column of pointers to the updating blocks of the data region in the first region, the physical block numbers #04H and #05H of the updating blocks of which the number is equal to that of the object blocks, are recognized. The physical block numbers of the updating blocks are recognized, for example, successively from the left of the column of pointers to the updating blocks of the data region.

Figure 9:
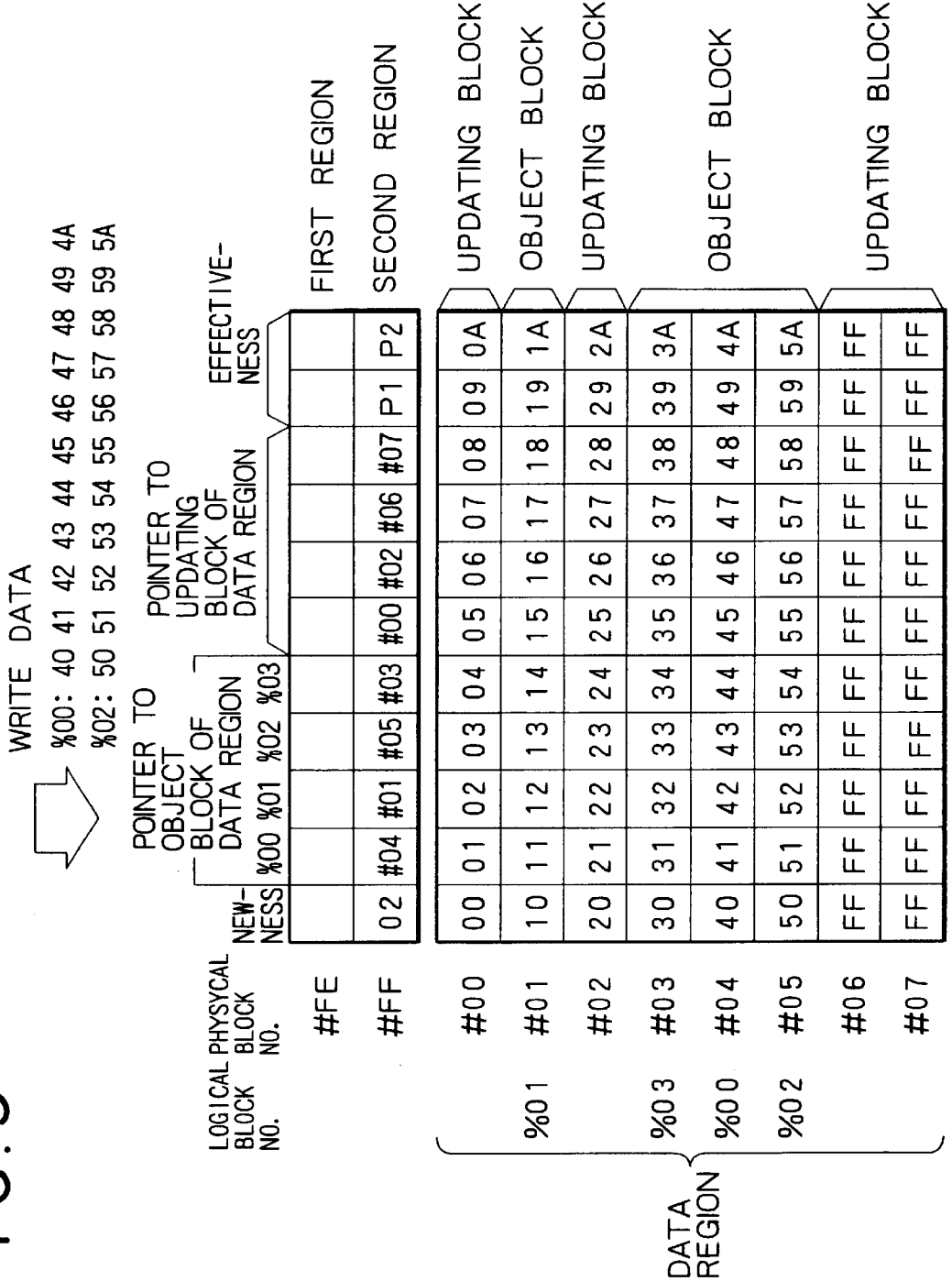
FIG. 9 is a diagram showing a typical construction of the memory to which the single pointer system is applied.

The two data which should have been written to the physical blocks #00H or #02H which are object blocks, are then written to the physical blocks #04H or #05H which are updating blocks respectively, as shown in FIG. 9.

In this case, FIG. 9 shows a state where the two data to be written to the physical block numbers #00H and #02H corresponding to the logical block numbers % 00H and % 02H are assumed to be 40AH through 4AH and 50AH through 5AH, respectively, and these data are written to the physical blocks #04H and #05H which are updating blocks, respectively.

Thereafter, the block numbers #04H and #05H of the physical blocks to which the new data were written and which were updating blocks, are written to the column of pointers to the object blocks of the data region in the second region which was not effective. That is, the column of pointers to the object blocks of the data region in the first region, is copied to the second region, and as shown in FIG.

9, the physical block numbers #00H or #02H of the object blocks are respectively rewritten to the physical block numbers #04H or #05H of the updating blocks to which data was actually written. As a result, looking at the second region, the physical block number #04H or #05H is respectively made to correspond to the logical block number % 00H or % 02H to which the physical block number #00H or #02H was made to correspond.

Further, the physical blocks #00H and #02H which were to be written with data, are changed to updating blocks, and the physical block numbers #00H and #02H are written to the column of pointers to the updating blocks of the data region in the second region which was not effective. That is, the column of pointers to the updating blocks of the data region in the first region is copied to the second region, and as shown by FIG. 9, the physical block numbers #04H or #05H of the physical blocks to which data was written is respectively rewritten by the physical block numbers #00H or #02H of the object blocks. As a result, looking at the second region, the physical blocks #00H and #02H become updating blocks.

After updating the second region as described above, similar to the case of FIG. 4, the newness information and the effectiveness information in the second region are successively written (rewritten), and data in the first region is then completely erased.

Therefore in this case, unless writing of the column of pointers to the object blocks in the data region is completed in the second region, the effectiveness information signifying effectiveness is not written. That is, in the above case, unless writing of data to both of the two logical blocks % 00H and % 02H is complete, the effectiveness information signifying effectiveness is not written to the second region.

As a result, when memory corruption is caused during a time period wherein data is being written to the two logical blocks % 00H and % 02H, only the first region remains effective, and by referring to the effective first region, old data stored in the physical blocks #00H and #02H which were respectively made to correspond to the logical blocks % 00H and % 02H, is read from the logical blocks % 00H and % 02H.

Therefore, when two data which are plural data stored in the logical blocks % 00H and % 02H are related to each other, not only the compatibility of individual data but also compatibility between the two data can be maintained even in the case where memory corruption occurs.

Figure 10:
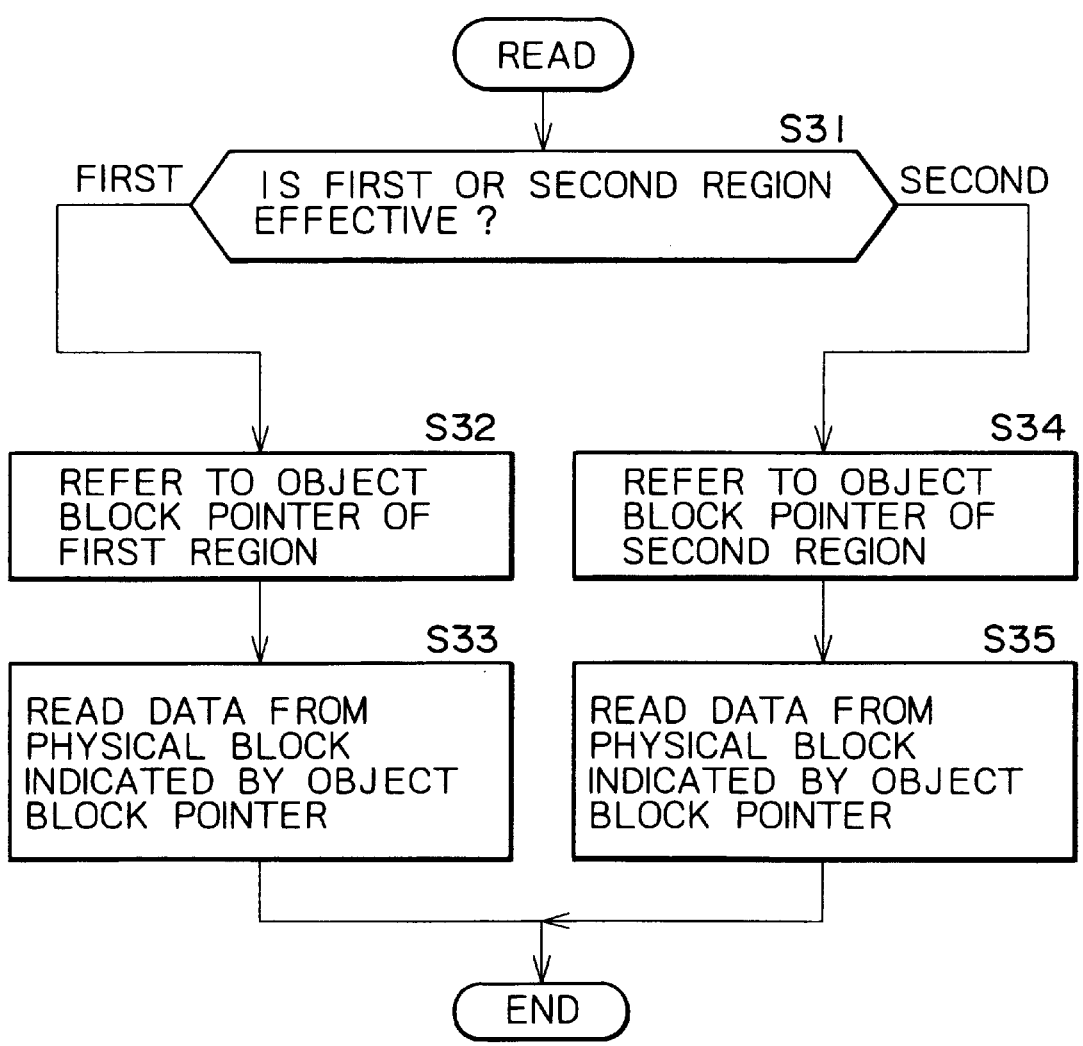
FIG. 10 is a flowchart for describing read processing by the single pointer system.
Figure 11:
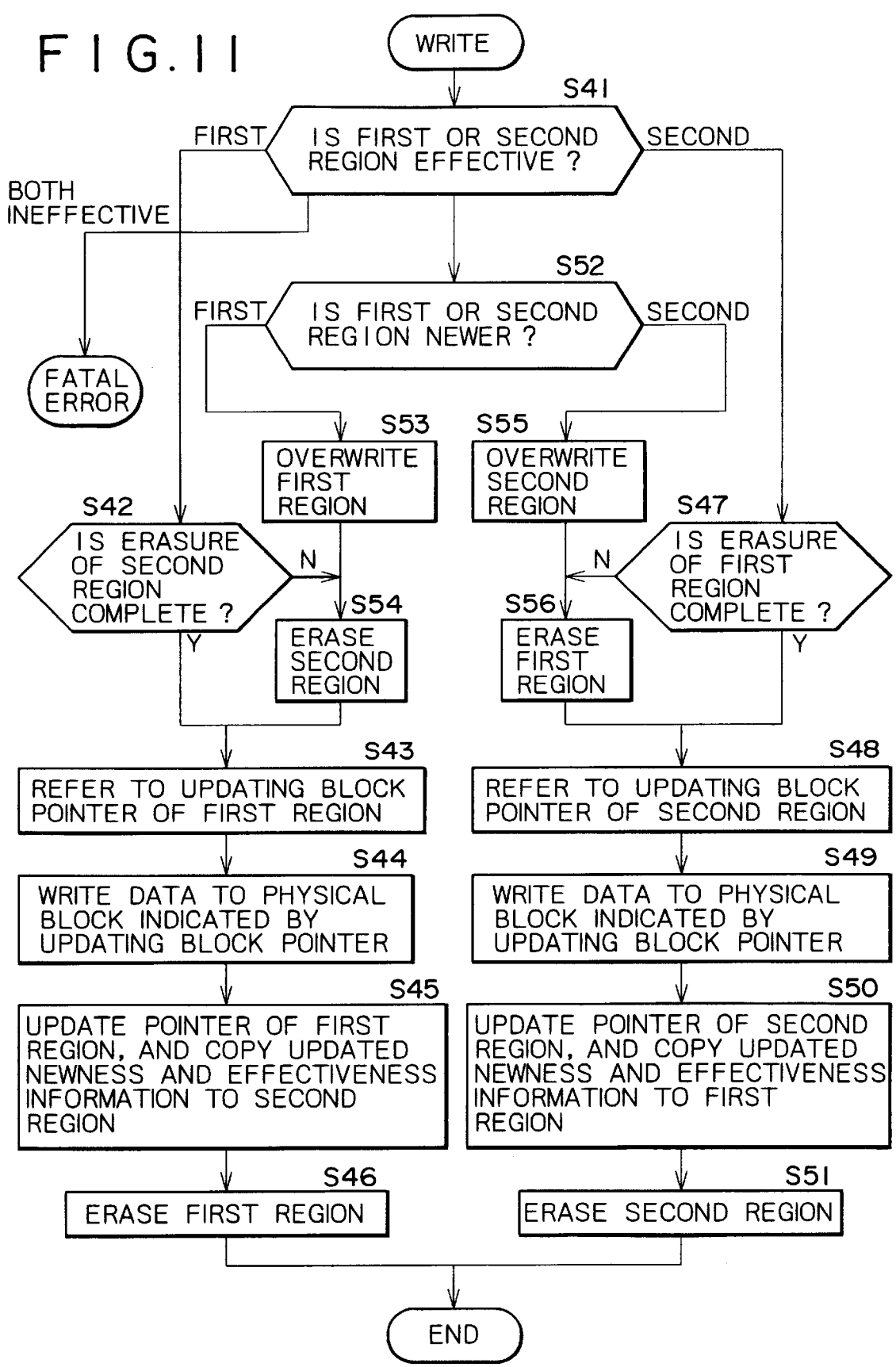
FIG. 11 is a flowchart for describing write processing by the single pointer system.

Next, a further explanation will be given of read and write processing of data in the memory having the construction shown in FIG. 8 and FIG. 9 referring to the flowcharts of FIG. 10 and FIG. 11.

First, a description will be given of read processing referring to the flowchart of FIG. 10.

In this case, firstly in a step S31, determination processing similar to that in the step S1 of FIG. 6 is performed.

When the first region is effective, the routine proceeds to a step S32 and when the second region is effective, the routine proceeds to a step S34.

In the step S32, by referring to the column of pointers to the object blocks of the data region in the first region, a physical block number corresponding to a logical block number (the logical block number is supplied, for example, from outside) of data to be read, that is, a physical block number which is a pointer to an object block, is recognized, and the routine proceeds to a step S33. In the step S33, data is read from the physical block corresponding to the physical block number recognized in the step S33, and the process is terminated.

On the other hand, in the step S24, by referring to the column of pointers to the object blocks of the data region in the second region, a physical block number corresponding to a logical block number of data to be read, that is, a physical block number which is a pointer to an object block, is recognized, and the routine proceeds to a step S35. In the step S35, data is read from the physical block corresponding to the physical block number recognized in the step S34, and the process is terminated.

Next, a description will be given of write processing referring to the flowchart of FIG. 11.

Figure 7:
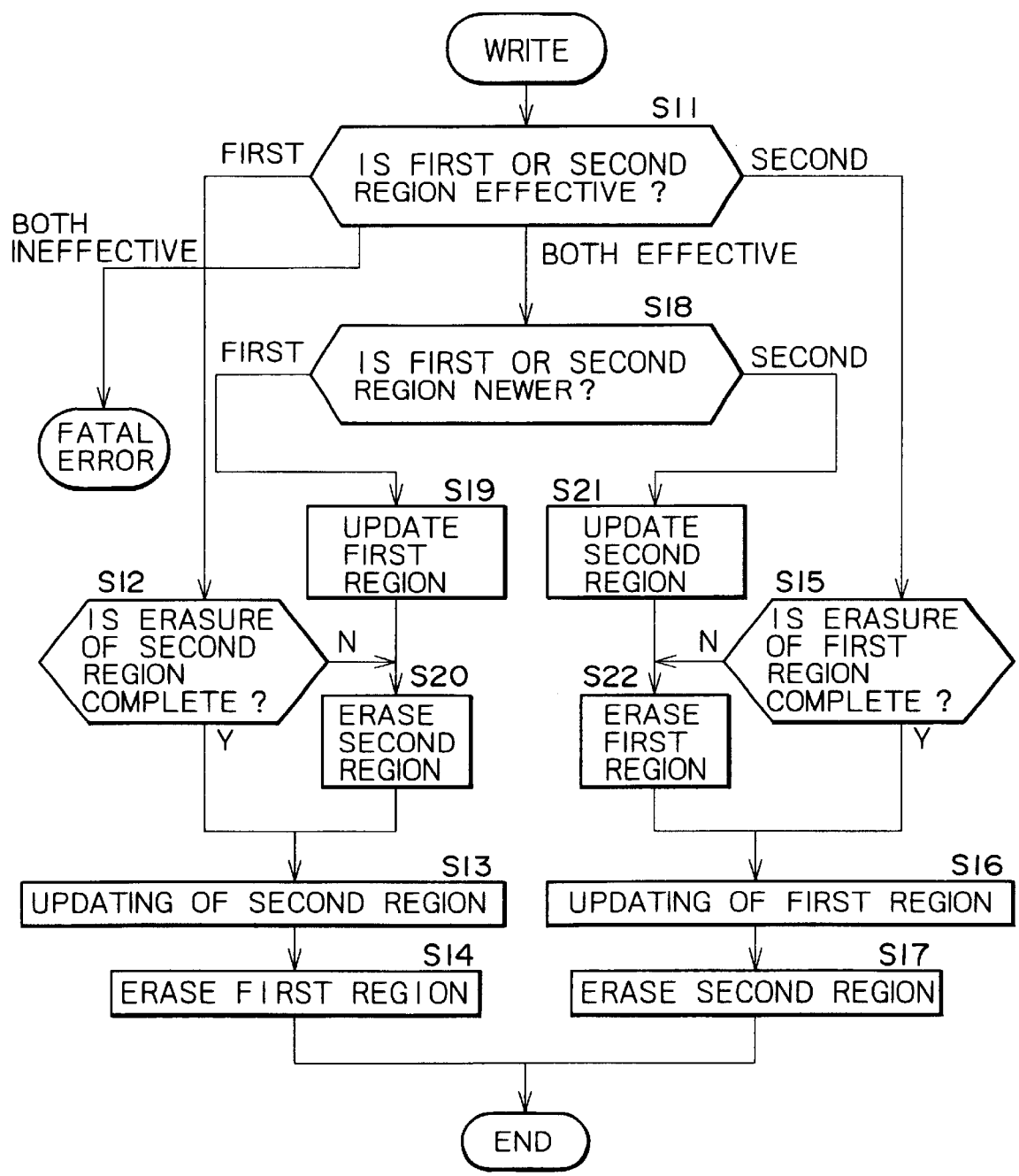
FIG. 7 is a flowchart for describing write processing relating to the memory having the construction shown in FIGS. 4A–4C.

Also in this case, in a step S41, determination processing similar to that in the step S11 of FIG. 7 is performed.

When only the first region is effective, the routine proceeds to a step S42, and it is determined whether or not data in the second region which is the ineffective block has been completely erased. When it is determined that the data has not been completely erased, the routine proceeds to a step S54, and when it is determined that the data has been erased, the routine proceeds to a step S43. In the step S54, data in the second region which is the ineffective block is erased and the routine proceeds to the step S43. In the step S43, a physical block number of a physical block which can be an updating block is recognized by referring to the column of pointers to the updating blocks of the data region in the first region, and the routine proceeds to a step S44. In the step S44, data to be written which is supplied from outside for example, is written to the physical block corresponding to the recognized physical block number, that is, an updating block.

Further, when data to be written to plural logical blocks is supplied from outside, in the step S43, the physical block numbers of updating blocks whereof the number is equal to that of the plural logical blocks, are recognized. In this case, in the step S44, the data from outside is successively written to the updating blocks respectively corresponding to the recognized plural physical block numbers.

Thereafter, the routine proceeds to a step S45, the column of pointers to the object blocks of the data region and the column of pointers to the updating blocks of the data region in the first region are updated, and the updated newness information and effectiveness information are copied to the second region.

That is, regarding the column of pointers to the object blocks of the data region in the first region, the physical block numbers which are made to correspond to the logical block numbers of the logical blocks to which data supplied from outside is to be written (#00H and #02H in the example of FIG. 8 and FIG. 9), are updated to the physical block numbers of the updating blocks to which data was actually written (#04H and #05H in the example of FIG. 8 and FIG. 9). Further, regarding the column of pointers to the updating blocks of the data region in the first region, the physical block numbers (#04H and #05H in the example of FIG. 8 and FIG. 9) of the physical blocks to which data was written (physical blocks which were updating blocks), are updated to the physical block numbers (#00H and #02H in the examples of FIG. 8 and FIG. 9) which were made to correspond to the logical block numbers of the logical blocks to which data was written. Further, the newness information and effectiveness information are updated, the above updating result is written to the second region, and the routine proceeds to a step S46. In the step S46, the data in the block which is the first region is erased.

On the other hand, when it is determined in the step S41 that the second region is effective, the same processing is performed in steps S47 through S51 and a step S56 as in the steps S42 through S46 and the step S54, except that processing for the first or second region is performed conversely for the second or first region, respectively.

When memory corruption occurs, as in the step S18 of FIG. 7, the newness of the block which is determined as the first or second region is determined in a step S52. In the step S52, when it is determined that the second region is newer than the first region, the routine proceeds to a step S55, the column of pointers to the object blocks of the data region and the column of pointers to the updating blocks of the data region in the second region are updated, and erasure of the first region which is not the newest is performed in the step S56. Subsequently, from steps S48 to S51, the processing is the same as that above.

Alternatively, when it is determined in the step S52 that the first region is newer than the second region, the same processing is performed in a step S53, the step S54 and the steps S43 to S46, as in the steps S55, S56 and the steps S48 to S51, except that processing for the first or second region is performed conversely for the second or first region, respectively.

The read and write system of the memory described referring to FIG. 8 through FIG. 11, uses one level of pointers to the data region and accordingly, in the following, the system is pertinently referred to as the single pointer system.

In the case of the single pointer system, as shown by FIG. 8 and FIG. 9, four physical block numbers can be stored in the column of pointers to the object blocks of the data region and therefore, data compatibility can be maintained at most for four blocks.

In this case, in FIG. 8 and FIG. 9, four physical block numbers can be stored in the column of pointers to the updating blocks of the data region similar to the column for pointers to the object blocks of the data region, because four updating blocks are also needed to write four blocks of data which is the maximum number of blocks capable of maintaining compatibility.

When the single pointer system is applied to the memory construction of FIG. 8 and FIG. 9, as described above, data compatibility can be maintained at most for four blocks, i.e. it is difficult to maintain a compatibility of more than four blocks. That is, when the physical block numbers of the physical blocks comprising the data region are stored in and managed by the physical blocks of the first and the second regions, the number of blocks for which data compatibility can be maintained, is restricted by the number of block numbers which can be stored in the physical blocks of the first and the second regions.

Figure 12:
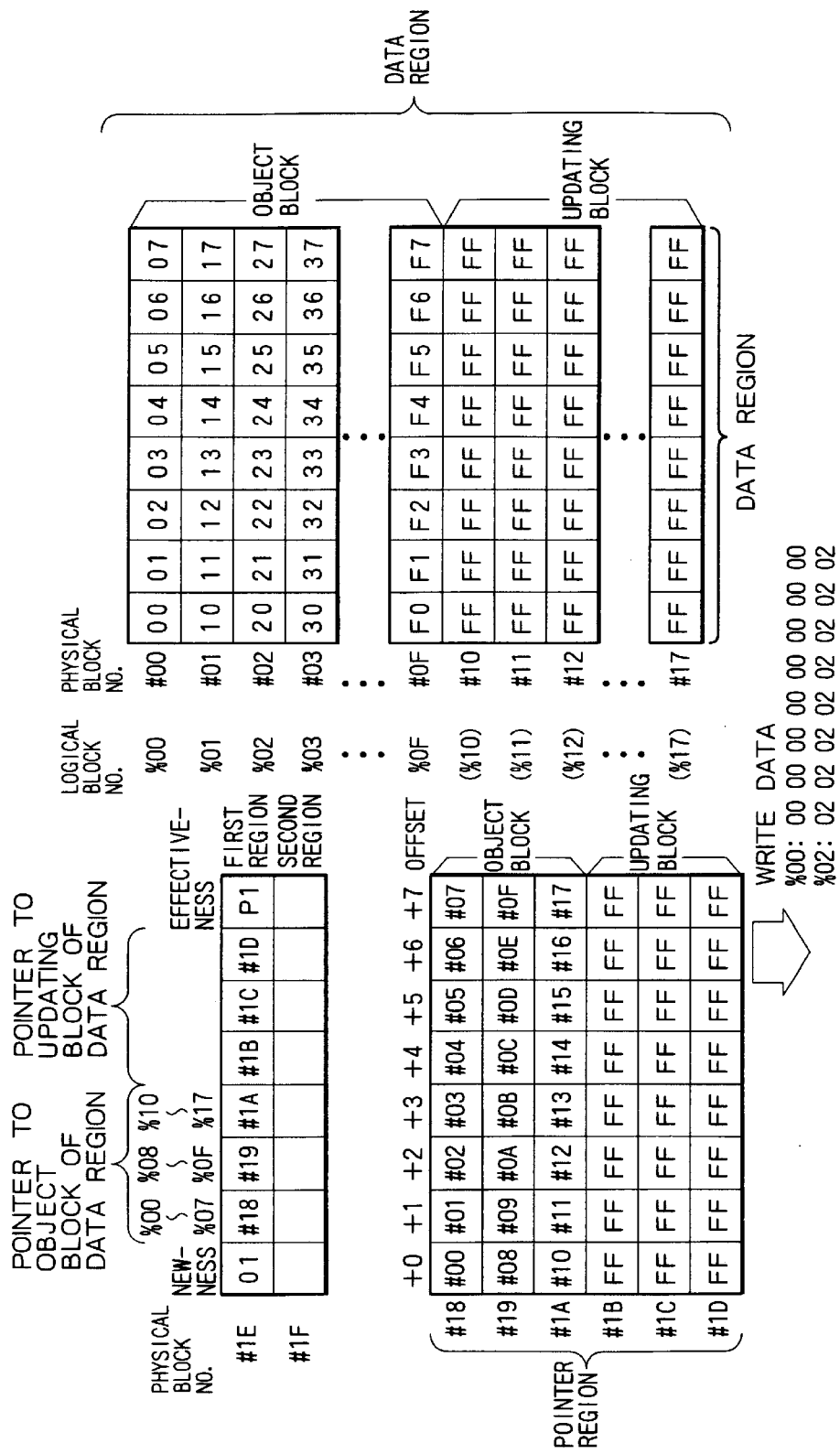
FIG. 12 is a diagram showing a typical construction of a memory to which a double pointer system is applied.

Hence the memory may for example have the construction shown in FIG. 12.

That is, in this case, the memory comprises physical blocks which are a data region for storing data, physical blocks which are a pointer region for storing block numbers which are pointers to the physical blocks comprising the data region, and physical blocks which are a first and second region for storing block numbers which are pointers to the physical blocks comprising the pointer region.

In FIG. 12, for convenience, one physical block takes up eight bytes.

The respective physical blocks comprising the data region store data in 8 byte units, and in FIG. 12, the data region comprises twenty-four physical blocks respectively designated by the physical block numbers #00H through #17H.

In this case, sixteen of the logical blocks are visible from outside and sixteen of the logical blocks are respectively assigned the logical block numbers %00H through %0FH However in this case, for convenience of explanation, the same number of logical blocks are assumed to exist as the number of physical blocks comprising the data region, and eight physical blocks other than the physical blocks which are visible from outside as logical blocks, are respectively allocated the imaginary logical block numbers %10 through %17. In the state shown in FIG. 12, the logical block numbers %00H through %17H are respectively made to correspond to the physical block numbers #00H through #17H.

The physical blocks comprising the pointer region (block number region) store physical block numbers which are pointers to the physical blocks comprising the data region in eight byte units, and in FIG. 12, the pointer region comprises six of the physical blocks respectively designated by the physical block numbers #18 through #1D. In this case, the physical blocks comprising the pointer region store the physical block numbers in 8 byte units and a physical block number is represented by one byte, so eight physical block numbers are stored by one physical block.

Further, the eight physical block numbers arranged in each of the physical blocks of the pointer region are made to correspond to logical block numbers. That is, the physical block numbers arranged from the 1st to 8th byte are made to correspond to logical block numbers which are offset (shifted) by 0 through 7 based on a certain logical block number (as mentioned later, %00H, %08H or %10H).

In the first and second regions, a first byte thereof is allocated to the newness information and a last byte thereof is allocated to the effectiveness information, respectively. Further, the physical block numbers which are pointers to the physical blocks of the pointer region are arranged in 6 bytes between the newness information and the effectiveness information.

That is, of the 6 bytes between the newness information and the effectiveness information in the first and second regions, the physical block numbers of the object blocks of the pointer region are arranged in the first 3 bytes (hereinafter, pertinently referred to as a column of pointers to the object blocks of the pointer region) and the physical block numbers of the updating blocks of the pointer region are arranged in the latter 3 bytes (hereinafter, pertinently referred to as a column of pointers to the updating blocks of the pointer region).

The physical block numbers stored by the physical blocks of the pointer region corresponding to the three physical block numbers arranged in the column of pointers to the object blocks of the pointer region in the first and second regions, are made to correspond to logical block numbers. That is, the physical block numbers stored in the physical blocks of the pointer region corresponding to the physical block numbers from the 1st to 3rd byte, are respectively made to correspond to the logical block numbers %00H through %07H, %08H through %0FH, or %10H through %17H.

Specifically for example, in FIG. 12, looking at the first region, the physical block numbers #00H through #07H arranged from the 1st to 8th byte of the physical blocks of the pointer region indicated by the physical block number #18H of the 1st byte in the column of pointers to the object blocks in the pointer region, are made to correspond respectively to the logical block numbers %00H through %07H which are made to correspond to the 1st byte in the column of pointers to the object blocks in the pointer region of the first region. That is, the physical block numbers arranged from the 1st to 8th byte of the physical blocks of the pointer region indicated by the physical block number of the 1st byte in the column of pointers to object blocks of the pointer region, are respectively made to correspond to the physical block numbers % 00H through % 07H which are offset by 0 through 7 based on the logical block number % 00H.

Similarly, the physical block numbers arranged from the 1st to 8th byte of the physical blocks in the pointer region indicated by the physical block number of the 2nd byte in the column of pointers to the object blocks of the pointer region, are respectively made to correspond to the logical block numbers % 08H through % 0FH which are offset by 0 through 7 based on the logical block number % 08H.

Further, in FIG. 12, the physical block number of the first or second region is respectively designated by #1E or #1F.

In the memory having the aforementioned construction, looking for example at the first region, the physical blocks corresponding to the physical block numbers given in the column of pointers to the object blocks of the pointer region, comprise the object blocks of the pointer region which should be accessed. Accordingly, in FIG. 12, the physical blocks #18H through #1AH comprise the object blocks of the pointer region. Further, in FIG. 12, the remaining physical blocks #1BH through #1DH in the pointer region are updating blocks for updating the pointer region, and the physical block numbers #1BH through #1DH are therefore described as a column of pointers to the updating blocks of the pointer region in the first region.

Further, in FIG. 12, the physical blocks of the data region corresponding to, for example, the logical blocks % 00H through % 0FH which correspond to physical blocks described as object blocks of the pointer region, are the object blocks of the data region. Accordingly, in FIG. 12, the physical blocks #00H through #0FH comprise the object blocks of the data region and the remaining physical blocks #10H through #17H of the data region (physical blocks corresponding to logical blocks % 10H through % 17H) comprise updating blocks for updating the data region.

In this case, as described above, the physical block numbers of the updating blocks to the pointer region are given in the column of pointers to the updating blocks of the pointer region, and therefore the updating blocks can be recognized by referring to the column.

On the other hand, as the updating blocks of the data region are physical blocks corresponding to the logical blocks % 10H through % 17H, by referring to the physical block of the pointer region corresponding to the physical block number described by the 3rd byte in the column of pointers to object blocks in the pointer region, the updating blocks can be recognized from the physical block number described therein.

Now assume that only one region of the first or second region, for example the first region, is effective, and a request for writing two related data is made from outside to, for example, the logical blocks corresponding to the logical block numbers % 00H and % 02H.

In this case, by referring to the column of pointers to the object blocks of the pointer region in the first region which is effective and by referring to the physical blocks corresponding to the physical block numbers described therein, the object blocks which are the physical blocks of the data region to which the two related data are to be written, are recognized. That is, firstly as mentioned above, by referring to the 1st byte of the column of pointers to the object blocks of the pointer region in the first region, the physical block #18H of the pointer region in which physical block numbers of the physical blocks in the data region are given corresponding to the logical blocks % 00H and % 02H, can be recognized. Further, by referring to the 1st byte and 3rd byte of the physical block #18H, the physical block numbers #00H and #02H of the physical blocks (object blocks) of the data region corresponding to the logical blocks % 00H and % 02H, can respectively be recognized.

Thereafter, the updating blocks of the data region are recognized. That is, as described above, by referring to the 3rd byte of the column of pointers to the object blocks of the pointer region in the first region, the physical block #1AH of the pointer region in which the physical block numbers of the physical blocks corresponding to the logical blocks % 10H through % 17H comprising the updating blocks of the data region are given, can be recognized. Further, by referring to the physical block #1AH, the physical block numbers #10H through #17H of the physical blocks comprising the updating blocks of the data region, can be recognized. Herein, the physical blocks whereof the number is equal to that of the object blocks of the data region to which data is written as updating blocks of the data region, are recognized by referring to the physical block #1AH, for example starting from the left. Therefore, the physical blocks of the data region corresponding to the physical block numbers #10H and #11H are treated as updating blocks.

Figure 13:
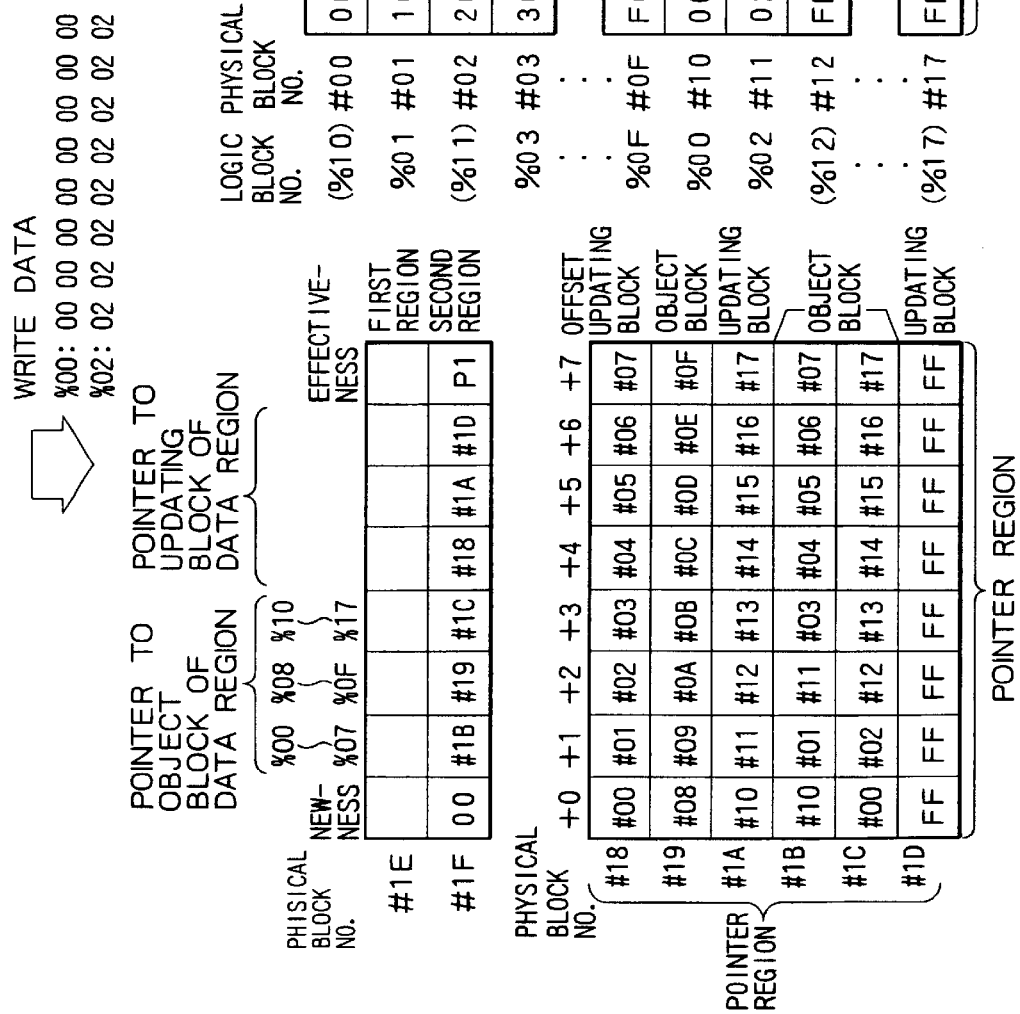
FIG. 13 is a diagram showing a typical construction of a memory to which the double pointer system is applied.

Hence, as shown in FIG. 13, the two data which were to have been written to the physical blocks #00H or #02H which are object blocks of the data region, are respectively written to the physical block #10H or #11H which are updating blocks of the data region.

In this case, FIG. 13 shows a state where the two data to be written to the physical block numbers #00H and #02H corresponding to the logical block numbers % 00H and % 02H, respectively designated by an 8 byte 00H and an 8 byte 02H, are respectively written to the physical blocks #10H and #11H which are updating blocks of the data region.

As described above, after writing the two data to be written to the physical blocks of the data region corresponding to the physical block numbers #00H and #02H stored by physical blocks corresponding to the physical block number #18H of the pointer region stored in the first region, respectively to the updating blocks #10H and #11H of the data region, the block numbers #10H and #11H of the physical blocks which were the updating blocks of the data region and to which the data were written, are written to the updating blocks of the pointer region, and the physical block numbers #00H and #02H of the physical blocks (object blocks) of the data region which were to have been written with data are written to other updating blocks of the pointer region.

That is, firstly, the updating blocks of the pointer region are recognized by referring to the column of pointers to the updating blocks of the pointer region in the first region. In this case, [of the updating blocks in the pointer region], the physical blocks whereof the number is equal to that of the object blocks of the pointer region which must be changed (updated) when data is written to the data region as described above, are recognized by referring to the column of pointers to the updating blocks of the pointer region successively starting from the left.

Accordingly, in the above case, the two updating blocks #1BH and #1CH of the pointer region whereof the number is equal to that of the two physical blocks of the physical block #1AH of the pointer region in which the physical block numbers #00H and #02H of the physical blocks (object blocks of the data region) to be written with data, the physical block 18H of the pointer region and the physical block numbers #10H and #11H of the physical blocks to which data was actually written, are recognized by referring to the column of pointers to the updating blocks of the pointer region in the first region successively starting from the left.

For example, in the updating block #1BH of the recognized updating blocks #1BH or #1CH of the pointer region, the storage content of the physical block #18H of the pointer region in which the physical block numbers #00H and #02H of the object blocks of the data region are stored, is copied, and the physical block numbers #00H or #02H of the object blocks of the data region in the storage content, are respectively rewritten by the physical block numbers #10H or #11H of the updating blocks of the data region to which data was actually written as shown by FIG. 13.

Further, in the remaining updating block #1CH of the recognized updating blocks #1BH or #1CH of the pointer region, the storage content of the physical block #1AH of the pointer region in which the physical block numbers #10H and #11H of the physical blocks to which data was actually written are stored, is copied, and the physical block numbers #10H and #11H are respectively rewritten by the physical block numbers (object blocks of data region) #00H and #02H to which data were to have been written, as shown in FIG. 13.

Thereafter, the block numbers #1BH and #1CH of the physical blocks which were the updating blocks of the pointer region where the physical block numbers were updated, are written to the column of pointers to the object blocks of the pointer region in the second region which was not effective. That is, the column of pointers to the object blocks of the pointer region in the first region is copied to the second region, a 1st byte of the first region corresponding to the logical addresses % 00H through % 07H, is rewritten by the physical block number #1BH of the physical block of the pointer region, and a 3rd byte thereof corresponding to the logical addresses % 10H through % 17H is rewritten by the physical block number #1CH of the pointer region (FIG. 13).

As a result, looking at the second region, the physical blocks #1BH, #19H and #1CH become the object blocks of the pointer region, and the physical blocks #10H or #11H which were the updating blocks of the data region, are respectively made to correspond to the logical block numbers % 00H or % 02H to which the physical blocks #00H or #02H which were object blocks of the data region, were made to correspond. Further, the physical blocks #00H or #02H which were object blocks are respectively made to correspond to the logical blocks % 10H or % 11H, and become updating blocks.

That is, referring to the 1st byte of the column of pointers to the object blocks of the pointer region in the second region, the physical block of the pointer region in which the physical block numbers of the physical blocks of the data region corresponding to the logical blocks % 00H and % 02H are given, is the physical block #1BH, and referring to the 1st byte and 3rd byte of the physical block #1BH, the physical blocks of the data region corresponding to the logical blocks % 00H and % 02H are respectively the physical blocks #10H and #11H. Referring to the 3rd byte of the column of pointers to the object blocks of the pointer region in the second region, the physical block of the pointer region in which the physical block numbers of the physical blocks of the data region corresponding to the logical blocks % 10H and % 11H are given, is the physical block #1CH, and referring to the 1st byte and 2nd byte of the physical block #1CH, the physical blocks of the data region corresponding to the logical blocks % 10H and % 11H, that is, the updating blocks of the data region, are the physical blocks #00H and #02H.

Further, the physical block number #18H of the physical blocks in the pointer region in which the physical block numbers #00H and #02H of the physical blocks to which data were to have been written, were stored, and the physical block number #1AH of the physical blocks in which the physical block numbers #10H and #11H to which data was actually written, were stored, are written to the column of pointers to the updating blocks of the pointer region in the second region which was ineffective. That is, the column of pointers to the updating blocks of the pointer region in the first region, is copied to the second region, and the physical block numbers #1BH or #1CH of the physical blocks of the pointer region in which the storage content has been updated, are respectively rewritten to the physical block number #18H in which the physical block numbers corresponding to the logical addresses % 00H through % 07H were stored, or to the physical block number #1AH in which the physical block numbers corresponding to the logical addresses % 10H through % 17H were stored, as shown in FIG. 13.

As a result, looking at the second region, the physical blocks #18H, #1AH and #1DH are the updating blocks of the pointer region.

After updating the second region as described above, similar to the case of the single pointer system, the newness information and effectiveness information in the second region are successively written.

Therefore in this case, unless writing operations in the data region and the pointer region has been completed, the effectiveness information signifying effectiveness cannot be written. That is, in the above case, unless the operation of writing data to the two logical blocks % 00H and % 02H has been completed, the effectiveness information signifying effectiveness cannot be written to the second region.

As a result, if memory corruption occurs during a time period where data is being written to the two logical blocks % 00H and % 02H, only the first region stays in an effective state and by referring to the first region which is effective, old data stored in the physical blocks #00H and #02H which are respectively made to correspond to the logical blocks % 00H and % 02H, is read from the logical blocks % 00H and % 02H.

On the other hand, when the operation of writing data to the two logical blocks % 00H and % 02H has been completed and the newness information and effectiveness information in the second region has been updated, by referring to the second region which is effective and the newest, new data stored in the physical blocks #10H and #11H which are respectively made to correspond to the logical blocks % 00H and % 02H, is read from the logical blocks % 00H and % 02H.

Accordingly, when the plural data are two data stored in the logical blocks % 00H and % 02H which are related, even in the case where memory corruption is caused, compatibility between the two data can be maintained as in the case of the single pointer system.

Further, the physical block numbers of three physical blocks in the pointer region can be stored in the column of pointers to the object blocks of the pointer region in the first and second regions, and the physical block numbers of eight physical blocks of the data region can be stored in one physical block of the pointer region, and therefore, 24(=3×8) physical blocks of the data region can be controlled at most. Accordingly, a maximum of twelve blocks which is half of the twenty-four blocks can be updating blocks of the data region, and data compatibility can be maintained for this number of blocks which is larger than the number of blocks in the single pointer system.

Further, in FIG. 12 and FIG. 13, eight blocks in the twenty-four blocks are updating blocks, and a maximum data compatibility of eight blocks can be maintained.

Herein, the read and write system of the memory which was described above referring to FIG. 12 and FIG. 13 uses, so to speak, two levels of pointers with respect to the data region, and is therefore pertinently referred to as the double pointer system in the following.

Figure 15A:
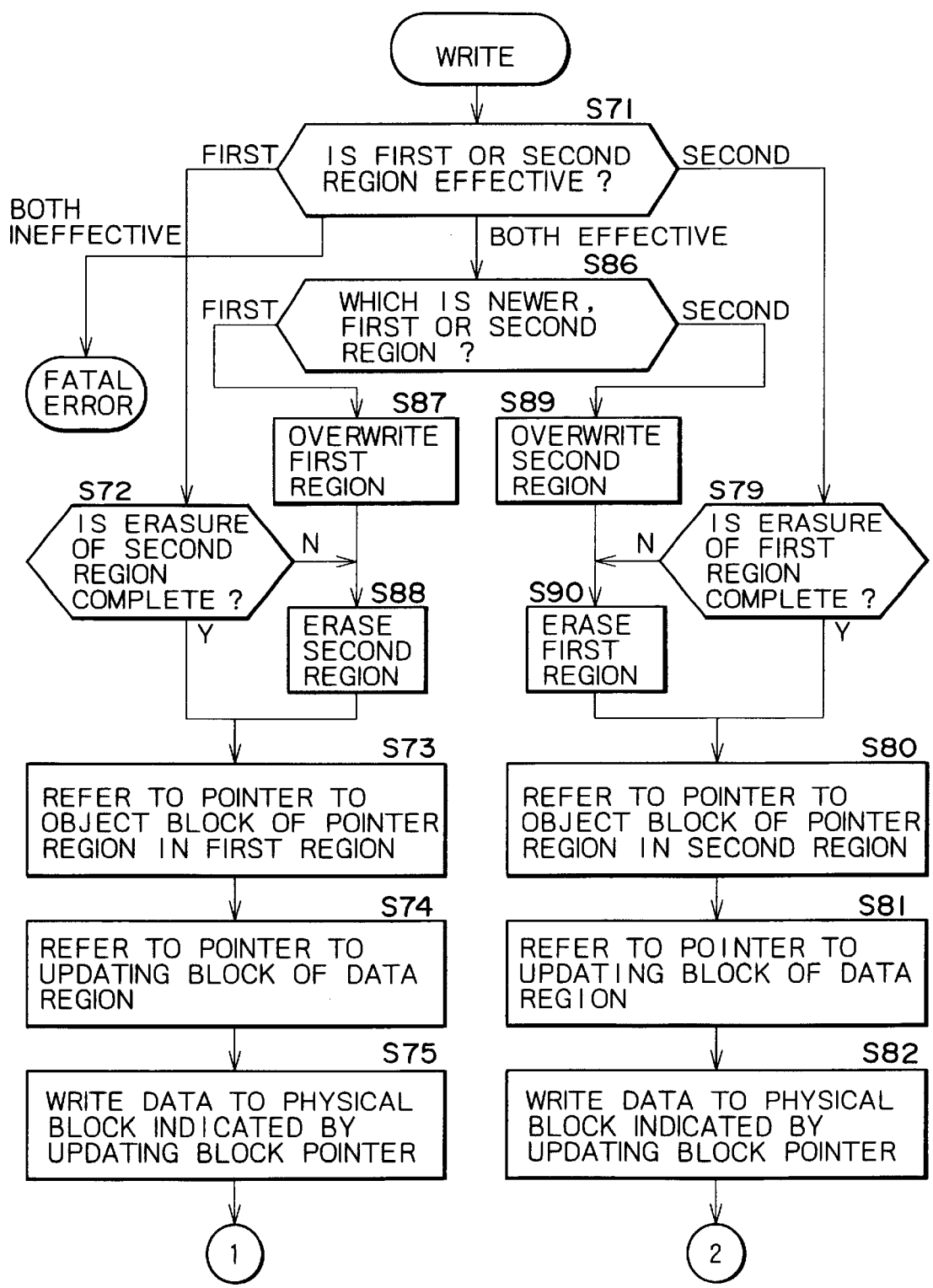
FIG. 15 is a flowchart for describing write processing by the double pointer system.
Figure 15B:
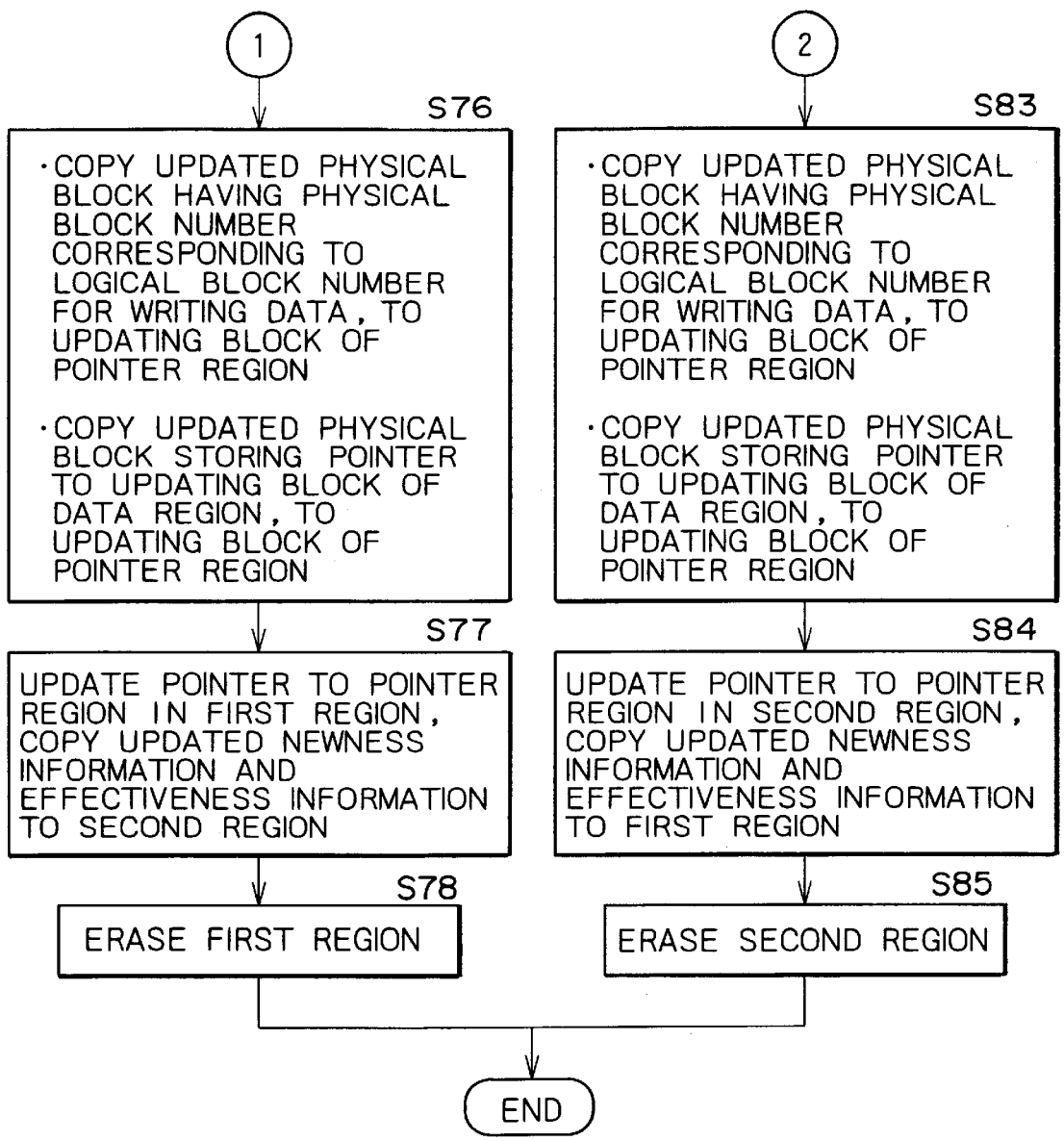
Figure 15:
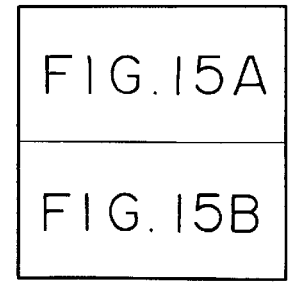

Next, a more detailed description of read and write processing of data according to the double pointer system will be given referring to the flowcharts of FIG. 14 and FIG. 15.

First, a description will be given of read processing referring to the flowchart of FIG. 14.

In this case, firstly in a step S61, determination processing similar to that in the step S1 of FIG. 6 is performed.

When only the first region is effective, the routine proceeds to a step S62, and when only the second region is effective, the routine proceeds to a step S65 In the step S62, by referring to the column of pointers to the object blocks of the pointer region in the first region, a physical block number (pointer) of a physical block of the pointer region where a physical block number is stored corresponding to a logical block number of data to be read, is recognized, and the routine proceeds to a step S63. That is, for example, when the memory has the construction described referring to FIG. 11, in the case where the logical block number falls in a range of % 00H through % 07H or % 08H through % 0FH, the physical block number stored in the first or the second byte of the column of pointers to the object blocks of the pointer region is respectively recognized.

In the step S63, by referring to the physical block of the pointer region corresponding to the physical block number recognized in the step S62, the physical block number corresponding to the logical block number of data to be read is recognized, and the routine proceeds to a step S64. That is, when the logical block number of data to be read is a value offset by 0 through 7 based on a certain reference value (% 00H or % 08H in the case of FIG. 12), the physical block number stored in a position shifted by the offset from the left of the physical block corresponding to the physical block number recognized in the step S63, is recognized as the physical block number corresponding to the logical block number of data to be read.

In the step S64, data is read from the physical block corresponding to the physical block number recognized in the step S63 and the process is terminated.

On the other hand, in a step S65, by referring to the column of pointers to the object blocks of the pointer region in the second region, the physical block number of the physical block of the pointer region in which the physical block number corresponding to the logical block number of data to be read is stored, is recognized, and thereafter the routine successively proceeds to steps S66 and S67 where processing respectively corresponding to the steps S63 and S64 is performed, and processing is terminated.

Next, a description will be given of write processing referring to the flowchart of FIG. 15.

Also in this case, in a step S71, determination processing similar to that in the step S11 of FIG. 7 is performed.

When the first region is effective, the routine proceeds to a step S72, and it is determined whether or not the data in the second region was erased. When it is determined that it was not erased, the routine proceeds to a step S88, and when it is determined that it was erased, the routine proceeds to a step S73. In the step S88, the data in the second region which is the ineffective block is erased, and the routine proceeds to a step S73. In the step S73, by referring to a column of pointers to object blocks in the pointer area in the first region, a physical block number of a physical block of the pointer area in which the physical block number was stored, is recognized, and the routine proceeds to a step S74. That is, for example, when the memory has the construction shown in FIG. 12, the physical block number #1AH stored in the 3rd byte of the column of pointers to the object blocks of the pointer region in the first region is recognized.

In the step S74, by referring to the physical block number of the updating block of the data region which is stored in the physical block corresponding to the physical block number recognized in the step S73, the updating block of the data region is recognized, the routine proceeds to a step S75, and data to be written which is supplied from outside or the like is written to the updating block of the data region.

Further, when data to be written to plural logical blocks is supplied from outside, in the step S74, the physical block numbers of the updating blocks of the data region whereof the number is equal to that of the plural logical blocks, are recognized by successively searching the physical blocks (physical blocks in pointer region) corresponding to the physical block numbers recognized in the step S73, for example, from left to right. Further in this case, in the step S75, data from outside are successively written to the updating blocks of the data region respectively corresponding to the plurality of physical block numbers recognized in this way.

Thereafter, the routine proceeds to a step S76, the physical blocks wherein physical block numbers which were made to correspond to the logical block numbers of logical blocks to which data was to be written, were stored, and which were updated, are copied to the updating blocks of the pointer region. That is, describing this for example referring to FIG. 12 and FIG. 13, the physical block #18H storing the physical block numbers #00H and #02H which were made to correspond to the logical block numbers % 00H and % 02H of logical blocks for writing data, is updated, and the physical block numbers #00H and #02H which were respectively changed to #10H and #11H, are copied to the updating block #1BH of the pointer region.

Further, in the step S76, the physical blocks storing the pointers to the updating blocks of the data region (physical block numbers of updating blocks of data region), which have been updated, are copied to the updating blocks of the pointer region. Describing this for example by referring to FIG. 12 and FIG. 13, the physical block #1AH storing the physical block numbers #10H through #17H of the updating blocks of the data region, is updated and the physical block numbers #10H and #11H are respectively changed to #00H and #02H, which is copied to the updating block #1C of the pointer region.

Next, the routine proceeds to a step S77, the column of pointers to the object blocks of the pointer region and the column of pointers to the updating blocks of the pointer regions in the first region, are updated, and the updated newness information and effectiveness information are copied to the second region.

That is taking the case of FIG. 12 and FIG. 13 as an example, regarding the column of pointers for the object blocks of the pointer region in the first region, the physical block number #18H stored in the 1st byte comprising pointers to the physical blocks #00H and #02H of the data region which were made to correspond to logical blocks for writing data supplied from outside, is updated to the physical block number #1BH comprising pointers to the physical blocks #10H and #11H of the data region to which the data was actually written, and the physical block number #1AH comprising pointers to the physical blocks #10H and #11H of the data region to which data was actually written, is updated to the physical block number #1CH comprising pointers to the physical blocks #00H and #02H of the data region which were made to correspond to logical blocks to which data was written.

Regarding the column of pointers to the updating blocks of the pointer region in the first region, the physical block numbers #1BH and #1CH of the physical blocks of the pointer region in which the physical block numbers were updated (physical blocks which are updating blocks), are updated respectively to the physical block numbers #18H and #1AH of the physical blocks which have become the updating blocks of the pointer region.

Further, the newness information and effectiveness information in the first region is updated, the aforesaid result of updating is written to the second region, and the routine proceeds to a step S78. In the step S78, all the data in the first region is erased.

On the other hand, in the step S71, when it is determined that the second region is effective, the same processing is performed in steps S79 through S85 and S90 as in the steps S72 through S78 and the step S88, except that processing for the first or second region is performed conversely for the second or first region, respectively.

When memory corruption occurs, in the step S71, the effectiveness of the first and second region is determined. In this case, the routine proceeds to a step S86, and the newness of the blocks of the first and second regions is determined. In the step S86, when it is determined that the second region is newer than the first region, the routine proceeds to a step S89, a pointer to a pointer area in the first region is updated in a block which is the new, second area, updated newness and effectiveness information is rewritten, and the routine proceeds to the step S90. Subsequently, in the steps S90 and S80 to S85, the same processing is performed as for the above case.

When it is determined in the step S86 that the first region is newer than the second region, the same processing is performed in a step S87 and the steps S88, S73 and S78 as in the steps S89, S90, S80 and S85, except that processing for the first or second region is performed conversely for the second or first region, respectively.

In the case of the double pointer system as in the case of the single pointer system, the number of the physical blocks capable of maintaining compatibility is restricted, however, when the double pointer system is expanded similarly to the case of expanding the single pointer system to the double pointer system, and pointers to the data region comprise 3 levels, 4 levels . . . the number of physical blocks capable of maintaining compatibility can be further increased. Accordingly, by considering the length of one block and pertinently setting the number of levels of pointers for the data region, the upper limit on the number of physical blocks capable of maintaining compatibility can be arranged to be a desired value.

Actually, read and write of data to and from the EEPROM 66 MUCK by the sequencer 91 of the IC card 2 shown by FIG. 3, is carried out in accordance with the above double pointer system, and an example of allocating the memory of the EEPROM 63 in this case is shown in FIG. 16.

In FIG. 16, the EEPROM 66 is provided with 256 physical blocks. Each physical block comprises a total of 40 bytes comprising 32 bytes of data units (D00 through D1f) and 8 bytes of parity units (P0 through P5).

Further, in FIG. 16, the physical block numbers #00H through #FFH are allocated respectively to the 256 physical blocks in which the physical blocks #00H through #EFH constitute the data region, the physical blocks #F0H through #FDH constitute the pointer region and the physical blocks #FEH and #FFH constitute the first and second regions, respectively.

Further, regarding the data region, of the 240 physical blocks #00H through #EFH, 224 physical blocks are object blocks (hereinafter, also referred to as data blocks) and the remaining 16 physical blocks are updating blocks. Accordingly, at most, a data compatibility of 16 blocks can be maintained.

Further, in the state shown by FIG. 16, the physical blocks #00H through #DFH are the data blocks and the physical blocks #E0H through #EFH are the updating blocks.

Regarding the pointer region, seven of the fourteen physical blocks #F0H through #FDH are object blocks (hereinafter, also referred to as pointer blocks), and 7 of the 14 physical blocks are updating blocks, respectively. Further, in the state shown by FIG. 16, the physical blocks #F01 through #F6H are pointer blocks and the physical blocks #F7H through #FDH are updating blocks.

Further, in FIG. 16, the first and second regions are illustrated as effectiveness determining blocks.

FIG. 17 shows an example of the construction of the effectiveness determining blocks (first and second regions). As shown by FIG. 17A, the newness information (newness determining information) is arranged in the 1st byte (D00) of the data unit of the effectiveness block, and the physical block numbers of object blocks (pointer blocks) of the pointer region are arranged at a 2nd through 8th byte (D01 through D07).

The physical block numbers of updating blocks in the data region are arranged in the 9th through 24th byte (D08 through D17) of the data region of the effectiveness determining block. That is in the above case, in the first and second regions, the physical block numbers of the physical blocks of the pointer region storing the physical block numbers of updating blocks of the data region (pointers of pointers to updating blocks of data region) are stored, however in this case, the physical block numbers of the updating blocks of the data region (pointers to updating blocks of data region) are directly arranged in the effectiveness determining block.

Accordingly, in this case, there is no physical block wherein the physical block number of an updating block of the data region is stored in a pointer region.

The physical block numbers of updating blocks of the pointer region are arranged in the 25th through 31st byte (D18 through D1e) of the data unit of the effectiveness determining block, and a 32nd byte thereof (D1f) is set aside as reserve.

Further, an RS code or the like corresponding to the above effectiveness determining information is arranged in the parity unit of the effectiveness determining block.

Here, FIG. 17B shows typical initial values of a data part in the effectiveness determining block when the EEPROM 66 has the construction shown in FIG. 16.

Next, FIG. 18 shows an example of the construction of physical blocks (pointer blocks and updating blocks thereof) comprising a pointer region.

As shown in FIG. 18A, the physical block numbers of the physical blocks of the data region are arranged in units of 32 in the data part (D00–D1f). The parity part of the physical block comprising the pointer region is not used as the aforementioned effectiveness information but serves as a normal parity and accordingly, it is preferable that information arranged in the parity part is provided with error correcting capability. This is because in the double pointer system, the effectiveness of whether or not there is an error in the information arranged in the data part of the physical blocks comprising the pointer region, is finally determined not by the information arranged in the parity part, but is based on the parity part as effectiveness information of the effectiveness determining block.

Herein, FIG. 18B shows typical initial values of the data part of the physical blocks comprising the pointer region when the EEPROM 66 has the construction shown in FIG. 16.

Further, the physical blocks (data blocks and updating blocks thereof) comprising the data region are similar to the physical blocks comprising the pointer region except that instead of physical block numbers, data for read and write is arranged in the data part, and therefore, a description thereof will be omitted.

As described above, after writing to the data region and after writing to the pointer region where pointers for physical blocks comprising the data region are stored, the storage content of the effectiveness determining block (first or second region) storing pointers to the physical blocks comprising the pointer region is updated, and therefore physical memory corruption in one or more physical blocks can be resolved. That is, not only memory corruption of one physical block comprising a data region, but also memory corruption of plural physical blocks, can be resolved.

Further, as described above, the effectiveness determining block and information stored in the pointer region serve as a conversion table for converting the logical block number in the data region to a physical block number and accordingly, when a fault occurs during a write routine in respect of the effectiveness determining block or the pointer region, although logical memory corruption is caused, such a logical memory corruption can be resolved.

As a result, even when a fault occurs while writing plural related data and memory corruption, the memory corruption can effectively be resolved in which the compatibility of the plural data is maintained.

As described above, although a description has been given of a case where the present invention is applied to a no-contact card system, the present invention is applicable to a storage unit of a memory or the like or any devices to which data is written. However, the present invention is particularly useful in a system where transmission and reception of data is carried out in a so-called unstable state as in, for example, the above no-contact card system, or, even with a contact type, a system where a user can freely insert or withdraw an IC card or the like.

Further, according to this form of the invention, although the physical block numbers of the updating blocks of the pointer region or the physical block numbers of the updating blocks of the data region are respectively stored in the effectiveness determining block or the pointer region as so-called vacant regions of the pointer region or the data region, the physical block numbers of the updating blocks need not necessarily be stored. However, when the physical block numbers of the updating blocks are not stored, in writing data, the physical blocks comprising the updating block must be detected by searching the store content of the EEPROM 66, and therefore it is preferable to store the physical block numbers of the updating blocks so as to achieve high speed processing.

Further, according to this form of the invention, although a region for storing the effectiveness determining block, the pointer region and the data region are allocated to predetermined positions on the EEPROM 66, the positions for allocating these regions are not particularly limited.

Furthermore, these regions need not be provided as regions in a continuous range on the EEPROM 66. That is, regions for respectively storing the effectiveness determining block, the pointer region or the data region can be provided at non-contiguous positions on the EEPROM 66.

Further, according to this form of the invention, only the storage content of the immediately preceding occasion is held in the EEPROM 66, otherwise, for example, the storage content of the immediately preceding occasion and the occasion preceding it can be held. However, in this cases further storage capacity is needed.

It will be understood that various modifications and applications may be envisaged within the scope and spirit of the invention, and therefore, this invention is not limited to the forms of the invention described herein.

What is claimed is:

1. A data processing method using a memory for storing information in blocks units, wherein said memory comprises a data region for storing data in block units and a first region and a second region for storing plural block numbers which are number assigned to blocks in said data region, said method comprising the steps of:

writing data to a block of said data region corresponding to said block number in one of said first and second regions, wherein said first and second regions store newness information or effectiveness information relating to the newness or effectiveness of storage content in addition to said plurality block numbers, and one region of said first and second regions is selected based on at least one of said newness information and the effectiveness information, then storing the block number of said block to which data was written in the other of said first and second regions, and then erasing the block number in said one of said first and second regions.

2. A data processing method as defined in claim 1, wherein, when said effectiveness information shows that both of said first and second regions are effective, the data in one region which is deemed to be newest according to said newness information is updated, the data in the other region which is not deemed to be newest is erased, and the data is written to a block of said data region corresponding to said block number stored in said one of said regions.

3. A data processing method as defined in claim 1, wherein a block number of a block in which data was written is stored in said other of said regions, said newness information and effectiveness information in the other of said regions are updated, and the data in said one of said regions is erased.

4. A data processing method as defined in claim 1, wherein, when either of said first and second regions is selected based on said effectiveness information and the data in said other of said regions has not been erased, the data in said other of said regions is erased, and the data is written to a block corresponding to said block number stored in said one of said regions.

5. A data processing apparatus for performing data processing using a memory for storing information in block units, wherein said memory comprises:

a data region for storing data in said block units, a pointer region for storing plural block numbers assigned to blocks in said data region, and a first region and a second region for storing plural block numbers assigned to blocks in said pointer region, wherein said first and said second regions store newness information or effectiveness information relating to the newness or effectiveness of storage content in addition to said plural block numbers, and one region of said first and second regions is selected based on at least one of said newness information and the effectiveness information, and wherein said apparatus is so operatively configured and programmed that:

data is written to a block corresponding to a block number in said pointer region in said one of said first and second regions, and to a corresponding block in said data region, thereafter the block number of said block to which data was written is stored in a block of said pointer region, and the stored block number of the block in said pointer region is stored in the other of said first and second regions, and thereafter the data stored in said one of said first and second regions is erased.

6. A data processing apparatus as defined in claim 5, wherein, when said effectiveness infonnation shows that both of said first and second regions are effective, the data in one region which is deemed to be newest according to said newness information is updated, the data in the other region which is not deemed to be newest is erased, and the data is written to a block corresponding to said block in said pointer region number said one of said first and second regions, and to a corresponding block in said data region.

7. A data processing apparatus as defined in claim 5, wherein a block number of a block in which data was written is stored in a block of said pointer region, the block number of the block in said pointer region is stored in said other of said first and second regions, said newness information and effectiveness information in the other of said regions are updated, and the data in said one of said regions is erased.

8. A data processing apparatus as defined in claim 5, wherein, when either of said first and second regions is selected based on said effectiveness information and the data in said other of said regions has not been erased, the data in said other of said regions is erased, and the data is written to a block region corresponding to said block number in said pointer region stored in said one of said first and second regions, and to a corresponding block in said data region.

9. A data processing method using a memory for storing information in block units, wherein said memory comprises a data region for storing data in block units and a first and a second region for storing plural block numbers pointers, said method comprising the steps of:

writing data to a block of said data region corresponding to a pointer in a pointer region identified from said block number pointer in one of said first and second regions, wherein said first and second regions store newness information or effectiveness information relating to the newness or effectiveness of storage content in addition to said plurality block number pointers, and one region of said first and second regions is selected based on at least one of said newness information and the effectiveness information;

storing the block number pointer that is associated with the pointer in the pointer region corresponding to the data in said data region; and erasing the block number pointer in said one of said first and second regions.

10. The data processing method as defined in claim 9, wherein, when said effectiveness information shows that both of said first and second regions are effective, the data in one region which is deemed to be newest according to said newness information is updated, the data in the other region which is not deemed to be newest is erased, and the data is written to a block of said data region that is associated with the pointer in the pointer region identified by the block number pointer stored in said one of said regions.

11. A data processing method as defined in claim 9, wherein a block number of a block in which data was written is associated with a pointer stored in said pointer region identified by said other of said regions, said newness information and effectiveness information in the other of said regions are updated and the data in said one of said regions is erased.

12. A data processing method as defined in claim 9, wherein, when either of said first and second regions is selected based on said effectiveness information and the data in said other of said regions has not been erased, the data in said other of said regions is erased, and the data is written to a block corresponding to said block number stored in said one of said regions.

* * * * *